United States Patent
Ando

(10) Patent No.: US 9,514,738 B2
(45) Date of Patent: Dec. 6, 2016

(54) METHOD AND DEVICE FOR RECOGNIZING SPEECH

(71) Applicants: Yoichi Ando, Kobe-shi, Hyogo (JP); Yoshimasa Electronic Inc., Shibuya-ku, Tokyo (JP)

(72) Inventor: Yoichi Ando, Kobe (JP)

(73) Assignees: Yoichi Ando, Kobe-shi, Hyogo (JP); Yoshimasa Electronic Inc., Shibuya-ku, Tokyo (JP)

( * ) Notice: Subject to any disclaimer, the term of this patent is extended or adjusted under 35 U.S.C. 154(b) by 0 days.

(21) Appl. No.: 14/442,191

(22) PCT Filed: Nov. 13, 2012

(86) PCT No.: PCT/JP2012/079880
§ 371 (c)(1),
(2) Date: May 12, 2015

(87) PCT Pub. No.: WO2014/076827
PCT Pub. Date: May 22, 2014

(65) Prior Publication Data
US 2015/0348536 A1  Dec. 3, 2015

(51) Int. Cl.
*G10L 15/00* (2013.01)
*G10L 15/01* (2013.01)
*G10L 15/02* (2006.01)
*G10L 15/04* (2013.01)
*G10L 15/10* (2006.01)
*G10L 25/06* (2013.01)

(52) U.S. Cl.
CPC ............... *G10L 15/01* (2013.01); *G10L 15/02* (2013.01); *G10L 15/04* (2013.01); *G10L 15/10* (2013.01); *G10L 25/06* (2013.01); *G10L 2015/027* (2013.01)

(58) Field of Classification Search
None
See application file for complete search history.

(56) References Cited

U.S. PATENT DOCUMENTS

| | | | | |
|---|---|---|---|---|
| 4,282,405 A | * | 8/1981 | Taguchi | ........... G10L 25/93 704/217 |
| 2005/0004792 A1 | * | 1/2005 | Ando | ............ G10L 15/02 704/217 |

FOREIGN PATENT DOCUMENTS

| | | |
|---|---|---|
| JP | S62-121500 A | 6/1987 |
| JP | H01-319099 A | 12/1989 |
| JP | 2003-177777 A | 6/2003 |
| WO | 2004/084176 A1 | 9/2004 |

OTHER PUBLICATIONS

Jan. 29, 2013 International Search Report issued in International Patent Application No. PCT/JP2012/079880.

* cited by examiner

*Primary Examiner* — Marcus T Riley
(74) *Attorney, Agent, or Firm* — Kenja IP Law PC

(57) ABSTRACT

A speech is recognized using ACF factors extracted from running autocorrelation functions calculated from the speech. The extracted ACF factors are a $W_{\phi(0)}$ (width of ACF amplitude around zero-delay origin), a $W_{\phi(0)max}$ (maximum value of the $W_{\phi(0)}$), a $\tau_1$ (pitch period), a $\phi_1$ (pitch strength), and a $\Delta\phi_1/\Delta t$ (rate of the pitch strength change). Syllables in the speech are identified by comparing the ACF factors with templates stored in a database.

18 Claims, 31 Drawing Sheets

FIG. 7

| Factor | (a) Factors observed at $(\tau_e)$min | | | | | Factor | (b) Factors observed after $(\tau_e)$min | | | | |
|---|---|---|---|---|---|---|---|---|---|---|---|
| | /a/ | /i/ | /u/ | /e/ | /o/ | | /a/ | /i/ | /u/ | /e/ | /o/ |
| $W_{\phi(0)}$ | 0.27 | 0.21 | 0.91 | 0.34 | 0.32 | $W_{\phi(0)}$ | 0.38 | 0.89 | 0.45 | 0.37 | 0.52 |
| | | | | | | $W_{\phi(0)max}$ | 0.44 | 1.04 | 0.90 | 0.52 | 0.59 |
| $\tau_1$ ms | 34.8 | 2.78 | 2.87 | 1.72 | 38.8 | $\tau_1$ ms | 6.75 | 5.53 | 6.21 | 6.82 | 6.43 |
| F0 Hz | 28.7 | 359 | 348 | 581 | 25.7 | F0 Hz | 148 | 180 | 161 | 146 | 155 |
| $\phi_1$ | 0.21 | 0.23 | 0.23 | 0.32 | 0.38 | $\phi_1$ | 0.71 | 0.84 | 0.73 | 0.64 | 0.82 |
| | | | | | | $\Delta\phi_1/\Delta t$ | 0.48 | 0.80 | 0.82 | 0.42 | 0.70 |
| $(\tau_e)$min ms | 2.23 | 9.0 | 11.1 | 3.73 | 2.35 | $\tau_e$ ms | 35.4 | 14.9 | 33.3 | 3.64 | 39.9 |
| | | | | | | $n^{th}$ frame | (3) | (6) | (3) | (3) | (2) |

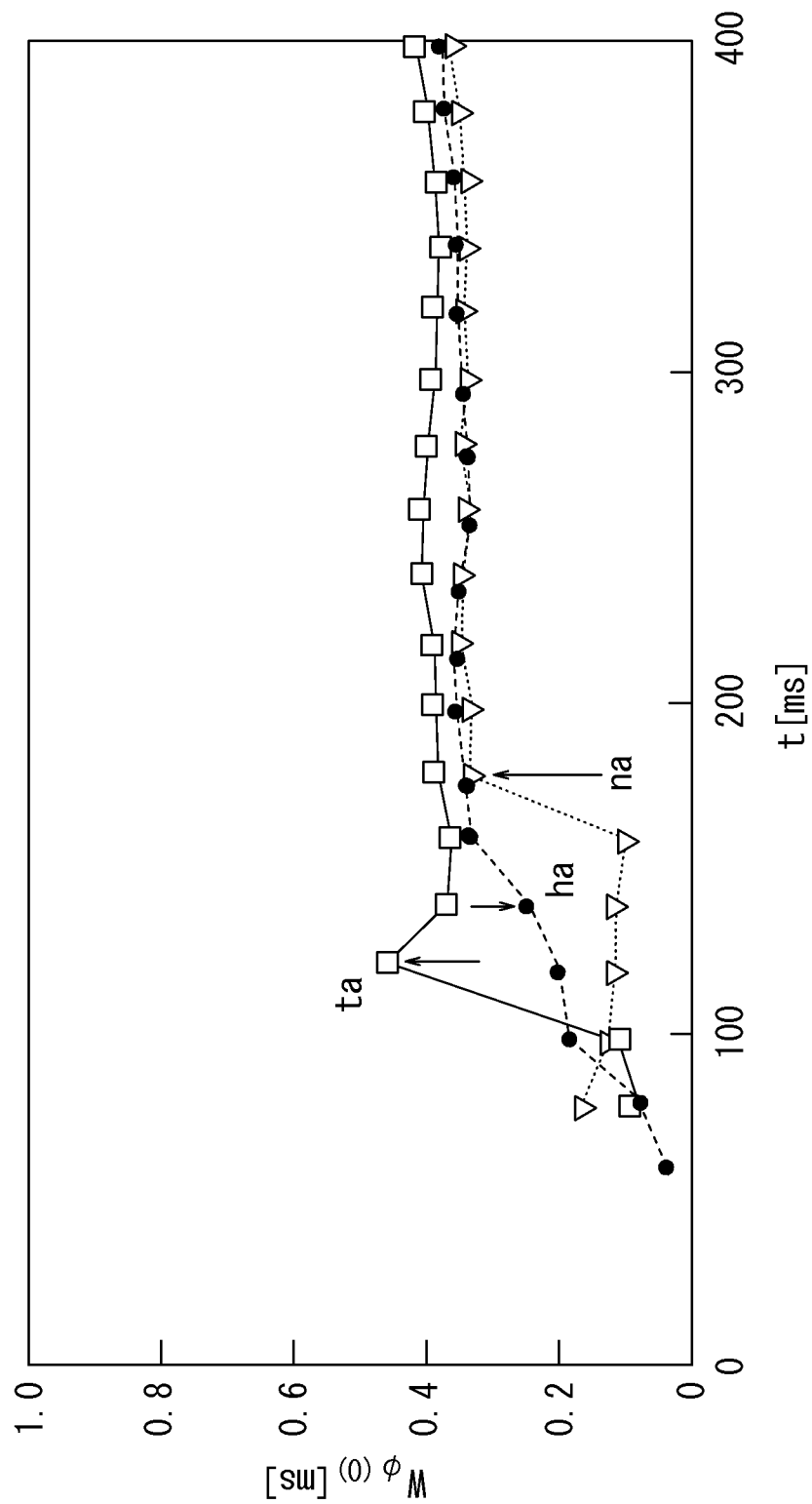

FIG. 10A

Consonant segment

| Factor | Factors observed at $(\tau_e)$min, within the isolated vowel /a/ and at CV boundaries | | | | | | | | | |
|---|---|---|---|---|---|---|---|---|---|---|
| | a | ka | sa | ta | na | ha | ma | ya | ra | wa |
| $W_{\phi(0)}$ | 0.37 | 0.06 | 0.42 | 0.39 | 0.34 | 0.35 | 1.08 | 1.19 | 0.42 | 0.65 |
| $\tau_1$ ms | 38.1 | 0.18 | 8.25 | 1.62 | 7.93 | 39.8 | 4.31 | 36.6 | 8.31 | 2.50 |
| F0 Hz | 26.2 | 555 | 121 | 617 | 126 | 25.1 | 232 | 27.3 | 120 | 400 |
| $\phi_1$ | 0.38 | 0.20 | 0.85 | 0.32 | 0.65 | 0.59 | 0.67 | 0.57 | 0.73 | 0.39 |
| $(\tau_e)_{min}$ ms | 4.74 | 1.99 | 3.65 | 2.56 | 4.25 | 1.81 | 19.5 | 4.54 | 4.88 | 7.50 |

FIG. 10B

Vowel segment

| Factor | Factors observed after $(\tau_e)$min, in the vowel segment | | | | | | | | | |
|---|---|---|---|---|---|---|---|---|---|---|
| | a | ka | sa | ta | na | ha | ma | ya | ra | wa |
| $W_{\phi(0)}$ | 0.40 | 0.26 | 0.42 | 0.39 | 1.18 | 0.34 | 0.36 | 1.19 | 1.19 | 0.42 |
| $W_{\phi(0)max}$ | 0.44 | 0.39 | 0.42 | 0.43 | 1.19 | 0.39 | 1.21 | 1.35 | 1.35 | 1.56 |
| $\tau_1$ ms | 8.93 | 8.81 | 8.25 | 7.81 | 7.93 | 8.00 | 7.68 | 8.25 | 8.31 | 7.31 |
| F0 Hz | 111 | 113 | 121 | 128 | 126 | 125 | 130 | 121 | 120 | 136 |
| $\phi_1$ | 0.73 | 0.74 | 0.85 | 0.77 | 0.65 | 0.67 | 0.81 | 0.70 | 0.73 | 0.89 |
| $\Delta\phi_1/\Delta t$ | 0.20 | 0.17 | 0.69 | 0.70 | 0.08 | 0.26 | 0.24 | 0.27 | 0.10 | 0.14 |
| $\tau_e$ ms | 45.2 | 5.72 | 3.65 | 80.7 | 4.25 | 631 | 7.0 | 29.5 | 4.88 | 166 |
| (n) | (12) | (2) | (1) | (3) | (0) | (1) | (6) | (2) | (0) | (5) |

FIG. 19

| Factor | Session | /a/ | /i/ | /u/ | /e/ | /o/ |
|---|---|---|---|---|---|---|
| $W_{\phi(0)}$ | 1 | 0.41 | 1.00 | 0.90 | 0.32 | 0.54 |
| | 2 | 0.36 | 0.93 | 0.49 | 0.27 | 0.46 |
| | 3 | 0.37 | 0.98 | 0.88 | 0.46 | 0.48 |
| | 4 | 0.38 | 0.97 | 0.80 | 0.57 | 0.57 |
| $W_{\phi(0)max}$ | 1 | 0.41 | 1.09 | 0.90 | 0.47 | 0.56 |
| | 2 | 0.42 | 1.06 | 0.89 | 0.61 | 0.58 |
| | 3 | 0.42 | 0.98 | 0.95 | 0.58 | 0.55 |
| | 4 | 0.40 | 1.04 | 0.93 | 0.57 | 0.58 |
| $\tau_1$ | 1 | 6.18 | 6.18 | 5.62 | 5.68 | 5.68 |
| | 2 | 5.37 | 5.87 | 5.50 | 5.25 | 5.37 |
| | 3 | 5.62 | 6.06 | 5.81 | 6.12 | 5.56 |
| | 4 | 5.93 | 6.00 | 5.37 | 6.00 | 6.50 |
| $1/\tau_1$ Hz | 1 | 161 | 161 | 177 | 176 | 176 |
| | 2 | 176 | 170 | 181 | 190 | 186 |
| | 3 | 177 | 165 | 172 | 163 | 179 |
| | 4 | 168 | 166 | 186 | 166 | 153 |
| $\phi_1$ | 1 | 0.65 | 0.62 | 0.87 | 0.67 | 0.79 |
| | 2 | 0.90 | 0.64 | 0.68 | 0.80 | 0.75 |
| | 3 | 0.84 | 0.73 | 0.87 | 0.66 | 0.73 |
| | 4 | 0.79 | 0.81 | 0.87 | 0.68 | 0.64 |
| $\Delta\phi_1/\Delta t$ | 1 | 0.45 | 0.51 | 1.08 | 0.55 | 0.80 |
| | 2 | 0.53 | 0.45 | 0.83 | 0.46 | 0.78 |
| | 3 | 0.44 | 0.75 | 1.08 | 0.60 | 0.70 |
| | 4 | 0.55 | 0.98 | 0.55 | 0.60 | 0.60 |
| $\tau_e$ | 1 | 23.5 | 24.8 | 91.8 | 52.3 | 159 |
| | 2 | 210 | 25.4 | 31.2 | 6.61 | 7.59 |
| | 3 | 86.0 | 33.1 | 50.1 | 49.6 | 15.7 |
| | 4 | 49.4 | 47.8 | 17.9 | 42.5 | 2.99 |

FIG. 20A

Values observed for Japanese morning greeting: "Ohayo gozaimasu."

| ACF Factors | Syllable | | | | | |
|---|---|---|---|---|---|---|
| | Oha | yo | go | zai | ma | su |
| Relative value: $LL_{max}$ dB | −29.4 | −25.4 | −32.3 | −26.3 | −32.1 | −42.5 |
| Duration n | 7 | 6 | 2 | 3 | 3 | 3 |
| $(\tau_e)_{min}$ | 2.49 | 2.94 | 2.52 | 3.81 | 2.76 | 4.70 |
| $\tau_1$ ms | 8.31 | 7.87 | 8.25 | 8.63 | 9.56 | 0.18 |
| $1/\tau_1$ Hz | 120 | 127 | 121 | 115 | 104 | 5555 |
| $\phi_1$ | 0.63 | 0.72 | 0.73 | 0.65 | 0.63 | 0.62 |
| $\Delta\phi_1/\Delta t(4.4)$ | 3.20 | 2.85 | 4.15 | 6.20 | 6.10 | 4.00 |
| $W_{\phi(0)max}$ | 0.82 | 0.56 | 1.14 | 0.57 | 1.11 | 1.42 |

FIG. 20B

Values observed for English morning greeting: "Good morning."

| ACF Factors | Syllable | | | |
|---|---|---|---|---|
| | Good | mor | ni | ng |
| Relative value: $LL_{max}$ dB | −27.0 | −22.8 | −31.0 | −35.7 |
| Duration n | 3 | 5 | 6 | 2 |
| $(\tau_e)_{min}$ | 7.63 | 4.10 | 5.43 | 2.56 |
| $\tau_1$ ms | 5.93 | 7.18 | 7.25 | 6.81 |
| $1/\tau_1$ Hz | 168 | 139 | 137 | 146 |
| $\phi_1$ | 0.73 | 0.79 | 0.86 | 0.86 |
| $\Delta\phi_1/\Delta t(6.9)$ | 7.00 | 8.00 | 10.5 | 2.10 |
| $W_{\phi(0)max}$ | 1.23 | 1.21 | 1.12 | 1.03 |

FIG. 20C

Values observed for German morning greeting: "Guten Morgen."

| ACF Factors | Syllable | | | |
|---|---|---|---|---|
| | Gu | ten | Mor | gen |
| Relative value: $LL_{max}$dB | −33.0 | −31.8 | −26.9 | −29.5 |
| Duration n | 3 | 3 | 6 | 4 |
| $(\tau_e)_{min}$ | 7.45 | 4.07 | 4.35 | 6.12 |
| $\tau_1$ ms | 6.93 | 8.75 | 7.50 | 8.18 |
| $1/\tau_1$ Hz | 144 | 114 | 133 | 122 |
| $\phi_1$ | 0.80 | 0.62 | 0.68 | 0.72 |
| $\Delta\phi_1/\Delta t(6.08)$ | 5.80 | 7.70 | 4.05 | 6.80 |
| $W_{\phi(0)max}$ | 1.05 | 1.14 | 1.34 | 1.20 |

FIG. 21A

Recording 1 (without noise; S/N~−61dB measured at the maximum SPL of "ga")

| ACF Factors | Syllable | | | | | | |
|---|---|---|---|---|---|---|---|
| | ka | ne | ga | na | ru | na | ri |
| Relative value: $LL_{max}$dB | −31.7 | −32.4 | −22.6 | −30.0 | −39.3 | −29.1 | −43.5 |
| Duration n | 3 | 6 | 5 | 4 | 5 | 3 | 2 |
| $(\tau_e)_{min}$ | 2.94 | 31.8 | 5.63 | 2.72 | 4.68 | 4.40 | 4.04 |
| $\tau_1$ ms | 6.62 | 7.12 | 6.68 | 7.56 | 7.68 | 7.93 | 11.0 |
| $1/\tau_1$ Hz | 151 | 140 | 149 | 132 | 130 | 126 | 90 |
| $\phi_1$ | 0.78 | 0.74 | 0.86 | 0.78 | 0.77 | 0.73 | 0.61 |
| $\Delta\phi_1/\Delta t(3.70)$ | 4.25 | 2.85 | 2.85 | 2.30 | 3.80 | 4.85 | 5.00 |
| Normalized (3.95) | 4.54 | 3.04 | 3.04 | 2.46 | 4.06 | 5.18 | 5.35 |
| $W_{\phi(0)max}$ | 0.40 | 1.02 | 0.40 | 1.35 | 1.25 | 1.45 | 1.15 |

FIG. 21B

Recording 2(without noise; S/N~−61dB measured at the maximum SPL of "ga")

| Factors | Syllable | | | | | | |
|---|---|---|---|---|---|---|---|
| | ka | ne | ga | na | ru | na | ri |
| Relative value: $LL_{max}$dB | −36.5 | −32.2 | −21.6 | −30.3 | −37.6 | −28.2 | −42.4 |
| Duration n | 3 | 7 | 4 | 4 | 6 | 4 | 4 |
| $(\tau_e)_{min}$ | 4.16 | 3.69 | 15.1 | 3.72 | 3.13 | 5.49 | 5.23 |
| $\tau_1$ ms | 7.25 | 7.06 | 6.25 | 7.81 | 7.37 | 7.93 | 9.0 |
| $1/\tau_1$ Hz | 137 | 141 | 160 | 128 | 135 | 126 | 111 |
| $\phi_1$ | 0.86 | 0.76 | 0.62 | 0.60 | 0.78 | 0.78 | 0.70 |
| $\Delta\phi_1/\Delta t$ (4.13) | 6.50 | 5.10 | 4.50 | 2.20 | 4.25 | 3.05 | 3.35 |
| Normalized (4.00) | 6.30 | 4.95 | 4.36 | 2.13 | 4.10 | 2.96 | 3.25 |
| $W_{\phi(0)max}$ | 0.43 | 0.99 | 0.40 | 1.25 | 1.18 | 1.12 | 1.20 |

FIG. 21C

Recording 3(with noise; S/N~−52 dB measured at the maximum SPL of "ga")

| Factors | Syllable | | | | | | |
|---|---|---|---|---|---|---|---|
| | ka | ne | ga | na | ru | na | ri |
| Relative value: $LL_{max}$dB | −33.6 | −27.4 | −19.3 | −29.4 | −30.4 | −26.6 | −41.0 |
| Duration n | 3 | 6 | 4 | 3 | 5 | 3 | 3 |
| $(\tau_e)_{min}$ | 6.54 | 4.12 | 4.13 | 3.98 | 3.34 | 13.0 | 4.30 |
| $\tau_1$ ms | 7.43 | 6.75 | 6.50 | 7.93 | 7.68 | 8.12 | 9.43 |
| $1/\tau_1$ Hz | 134 | 148 | 153 | 126 | 130 | 123 | 106 |
| $\phi_1$ | 0.74 | 0.70 | 0.63 | 0.72 | 0.70 | 0.74 | 0.62 |
| $\Delta\phi_1/\Delta t$ (3.54) | 6.50 | 2.90 | 3.25 | 2.15 | 4.25 | 2.80 | 2.95 |
| Normalized (3.96) | 7.28 | 3.33 | 3.64 | 2.47 | 4.76 | 3.13 | 3.30 |
| $W_{\phi(0)max}$ | 1.12 | 0.43 | 0.43 | 1.15 | 1.13 | 1.36 | 1.27 |

FIG. 21D

Recording 4(with noise; S/N~−52dB measured at the maximum SPL of "ga")

| ACF Factors | Syllable | | | | | | |
|---|---|---|---|---|---|---|---|
| | ka | ne | ga | na | ru | na | ri |
| Relative value: $LL_{max}$dB | −29.7 | −28.9 | −21.1 | −31.2 | −32.9 | −27.1 | −39.1 |
| Duration n | 3 | 5 | 4 | 3 | 4 | 3 | 3 |
| $(\tau_e)_{min}$ | 5.34 | 2.51 | 6.04 | 3.95 | 3.46 | 14.0 | 2.99 |
| $\tau_1$ ms | 7.00 | 6.68 | 6.75 | 7.50 | 7.56 | 7.87 | 9.25 |
| $1/\tau_1$ Hz | 142 | 149 | 148 | 133 | 132 | 127 | 108 |
| $\phi_1$ | 0.66 | 0.73 | 0.72 | 0.67 | 0.77 | 0.63 | 0.67 |
| $\Delta\phi_1/\Delta t$, (Avg=4.60) | 11.6 | 5.50 | 4.35 | 2.75 | 1.90 | 3.15 | 3.00 |
| Normalized (4.00) | 10.0 | 4.78 | 3.78 | 2.39 | 1.65 | 2.73 | 2.60 |
| $W_{\phi(0)max}$ | 0.55 | 1.06 | 0.47 | 1.29 | 1.23 | 1.34 | 1.25 |

METHOD AND DEVICE FOR RECOGNIZING SPEECH

TECHNICAL FIELD

This disclosure relates generally to methods and devices for recognizing speech and, in particular, to a method and a device for recognizing speech which is based on autocorrelation functions (ACF).

BACKGROUND ART

WO 2004/084176 (PTL 1) discloses a method for objectively evaluating sound such as tone color, timbre, subjective diffuseness, apparent source width, etc. using factors extracted from auto correlation functions (hereinafter "ACF factors") and factors extracted from interaural crosscorrelation functions (hereinafter "IACF factors").

A conventional method in speech recognition technologies is to obtain a feature vector of a speech signal by analyzing an input speech signal for overlapping short period analysis segments (frames) in a fixed time interval, and to perform speech matching based on time-domain signal of the feature vector.

Many methods have been offered for analyzing these feature vectors, with typical methods including spectrum analysis and cepstrum analysis.

CITATION LIST

Patent Literature

PTL 1: WO 2004/084176

Incidentally, although the various analytical methods such as spectrum analysis and cepstrum analysis are different in their details, ultimately they all focus on the issue of how to estimate speech signal spectra. And although these methods are potentially effective due to the fact that speech signal features are evident in the structure of the spectra, they have the following problems:

(1) Since speech signals include wide ranging frequency information, complex parameters are required to reproduce their spectra. Also, many of these parameters are not substantially important in terms of auditory perception and can thus become a cause of prediction errors.

(2) Conventional analytical methods have problems involving poor handling of noise, and there are limitations in analyzing spectra that have widely varying patterns due to background noise and reverberations.

(3) In order to achieve speech recognition in actual environments, it is necessary to deal with such particulars as the movement of speakers and multiple sources of sound typified by the so-called "cocktail party effect", but little consideration is given in conventional analytical methods to the spatial information of such acoustic fields, and consequently difficulties are faced in performing speech characteristic extraction that reflects human auditory perception in actual sound fields.

SUMMARY

In one or more embodiments, a method for recognizing speech includes the steps of calculating running autocorrelation functions from a speech; extracting ACF factors from the running autocorrelation functions; identifying syllables in the speech by comparing the ACF factors with templates stored in a database. The extracting step extracts following ACF factors: a $W_{\phi(0)}$ (width of ACF amplitude around zero-delay origin); a $W_{\phi(0)max}$ (maximum value of the $W_{\alpha(0)}$); a $\tau_1$ (pitch period); a $\phi_1$ (pitch strength); and a $\Delta\phi_1/\Delta t$ (rate of the pitch strength change).

The method for recognizing speech may further include the step of segmenting the speech into syllables based on the ACF factors.

The method for recognizing speech may further include the steps of extracting a LL (listening level) and a $(\tau_e)_{min}$ (a minimum value of effective duration $\tau_e$) from the running autocorrelation functions; and segmenting the speech into syllables based on the LL, the $(\tau_e)_{min}$, the $\Delta\phi_1/\Delta t$, the $\tau_1$ and the $W_{\phi(0)}$.

The identifying step of the method for recognizing speech may be performed in each of the syllables at time points after the $(\tau_e)_{min}$.

The identifying step of the method for recognizing speech may identify the syllables in the speech based on a total distance between the ACF factors and the templates.

In one or more embodiments, a speech recognition device includes a recording unit configured to record a speech; an ACF calculating unit configured to calculate running autocorrelation functions from the speech; an ACF factor extracting unit configured to extract ACF factors from the running autocorrelation functions; an identification unit configured to identify syllables in the speech by comparing the ACF factors with templates in a database. The ACF factor extracting unit extracts following ACF factors: a $W_{\phi(0)}$ (width of ACF amplitude around zero-delay origin); a $W_{\phi(0)max}$ (maximum value of the $W_{\alpha(0)}$); a $\tau_1$ (pitch period); a $\phi_1$ (pitch strength); and a $\Delta\phi_1/\Delta t$ (rate of the pitch strength change).

The speech recognition device may further include a segmentation unit configured to segment the speech into syllables based on the ACF factors.

The ACF factor extracting unit of the speech recognition device may further extract a LL (listening level) and a $(\tau_e)_{min}$ (a minimum value of effective duration $\tau_e$) from the running autocorrelation functions, and may further include a segmentation unit configured to segment the speech into syllables based on the LL, the $(\tau_e)_{min}$, the $\Delta_{\phi 1}/\Delta t$, the $\tau_1$ and the $W_{\phi(0)}$.

The identification unit of the speech recognition device may identify each of the syllables at a time point after the $(\tau_e)_{min}$.

The identification unit of the speech recognition device may identify the syllables in the speech based on a total distance between the ACF factors and the templates.

According to one or more embodiments, syllables in speech can be identified by extracting ACF factors from the running autocorrelation functions calculated from the speech. Thus, the speech can be recognized with simple configuration without performing spectral analysis.

Moreover, the speech can be segmented into syllables by using the ACF factors.

Moreover, the speech can be identified at appropriate time points by extracting the minimum value of effective duration from the running auto correlation functions.

Moreover, the speech can be identified appropriately by using a total distance between the ACF factors and the templates.

BRIEF DESCRIPTION OF THE DRAWINGS

FIG. 7 is a table that lists the values of ACF factors extracted from five Japanese vowels.

FIG. 8B is a graph of Japanese syllables /ta/, /na/ and /ha/ plotting $W_{\phi(0)}$ on a vertical axis and the time on a horizontal axis.

FIG. 10A is a table that lists the values of ACF factors extracted from ten Japanese syllables at $(\tau_e)_{min}$.

FIG. 10B is a table that lists the values of ACF factors extracted from ten Japanese syllables after $(\tau_e)_{min}$.

FIG. 19 is a table that lists the values of ACF factors extracted from five Japanese vowels recorded four times.

FIG. 20A is a table that lists the values of ACF factors extracted from Japanese greeting phrase "Ohayo-gozaimasu".

FIG. 20B is a table that lists the values of ACF factors extracted from English greeting phrase "Good morning".

FIG. 20C is a table that lists the values of ACF factors extracted from German greeting phrase "Guten Morgen".

FIG. 21A is a table that lists the values of ACF factors extracted from first recorded Japanese Haiku phrase "kaneganarunari" without noise condition.

FIG. 21B is a table that lists the values of ACF factors extracted from second recorded Japanese Haiku phrase "kaneganarunari" without noise condition.

FIG. 21C is a table that lists the values of ACF factors extracted from third recorded Japanese Haiku phrase "kaneganarunari" with noise condition.

FIG. 21D is a table that lists the values of ACF factors extracted from fourth recorded Japanese Haiku phrase "kaneganarunari" with noise condition.

DETAILED DESCRIPTION

Our device and method will be described in detail with reference to the accompanying drawings.

Figure 1:
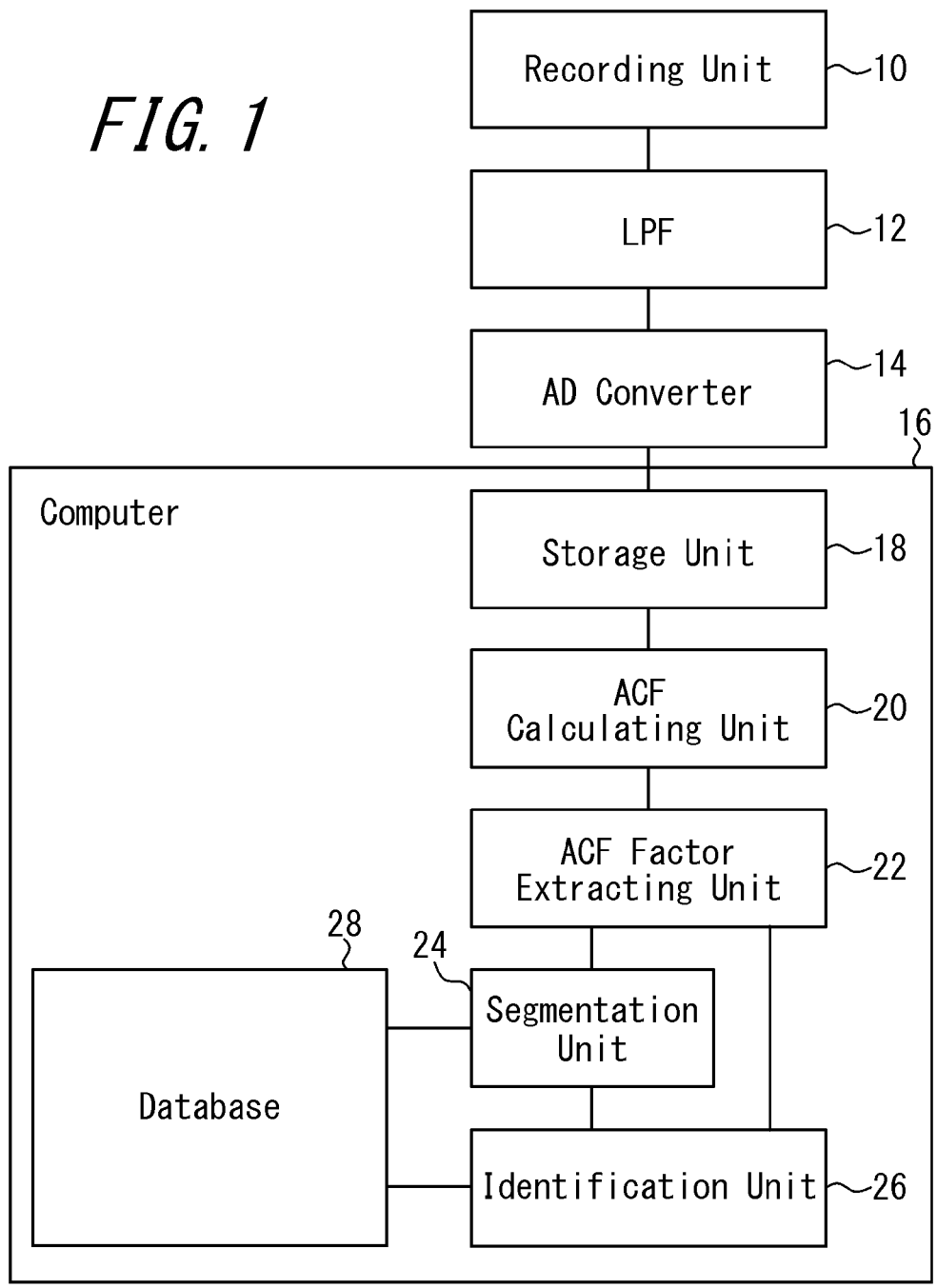
FIG. 1 is a block diagram of a speech recognition device in accordance with an embodiment.

FIG. 1 is a block diagram of a speech recognition device in accordance with an embodiment.

The speech recognition device shown in FIG. 1 includes a recording unit 10 that records speech signals, a low-pass filter (LPF) 12, an AD converter 14 and a computer 16.

The computer 16 includes a storage unit 18, an ACF calculating unit 20, an ACF factor extracting unit 22, a segmentation unit 24, an identification unit 26 and a database 28.

The storage unit 18 stores the speech signals received from the AD converter 14.

The ACF calculating unit 20 reads out the speech signals from the storage unit 18 and calculates running autocorrelation functions. The calculation process will be explained later in detail. The ACF calculating unit 20 also applies an A-weighting network to the speech signals before calculating the running autocorrelation functions. It should be noted that the A-weighting network approximates the effects of physical transmission including sound and vibration systems through the ear to oval window.

The ACF factor extracting unit 22 extracts ACF factors from the ACF calculated by the ACF calculating unit 20. The ACF factors are such as $W_{\phi(0)}$ (width of ACF amplitude around zero-delay origin, spectral tilt), $W_{\phi(0)}$ (maximum value of $W_{\phi(0)}$), $\tau 1$ (pitch period), $\phi 1$ (pitch strength), $\tau_e$ (effective duration), $(\tau_e)_{min}$ (minimum value of effective duration $\tau_e$), $\Delta\phi 1/\Delta t$ (the rate of the pitch strength change), LL (listening level), $LL_{max}$ (maximum value of LL), etc. The extraction process of the ACF factors will be explained later in detail.

The segmentation unit 24 segments the speech into syllables based on ACF factors such as LL, $(\tau_e)_{min}$, $\Delta\phi 1/\Delta t$, $\tau 1$ and $W_{\phi(0)}$.

The identification unit 26 identifies syllables by comparing the ACF factors, which are obtained from the speech signals in the above-mentioned processes, with a speech recognition template stored in the database 28. The syllable recognition process will be explained later in detail.

The database 28 stores templates, which are sets of ACF factors, calculated in advance related to all syllables. The templates are used for comparison with the ACF factors in order to identify the syllables.

Figure 2:
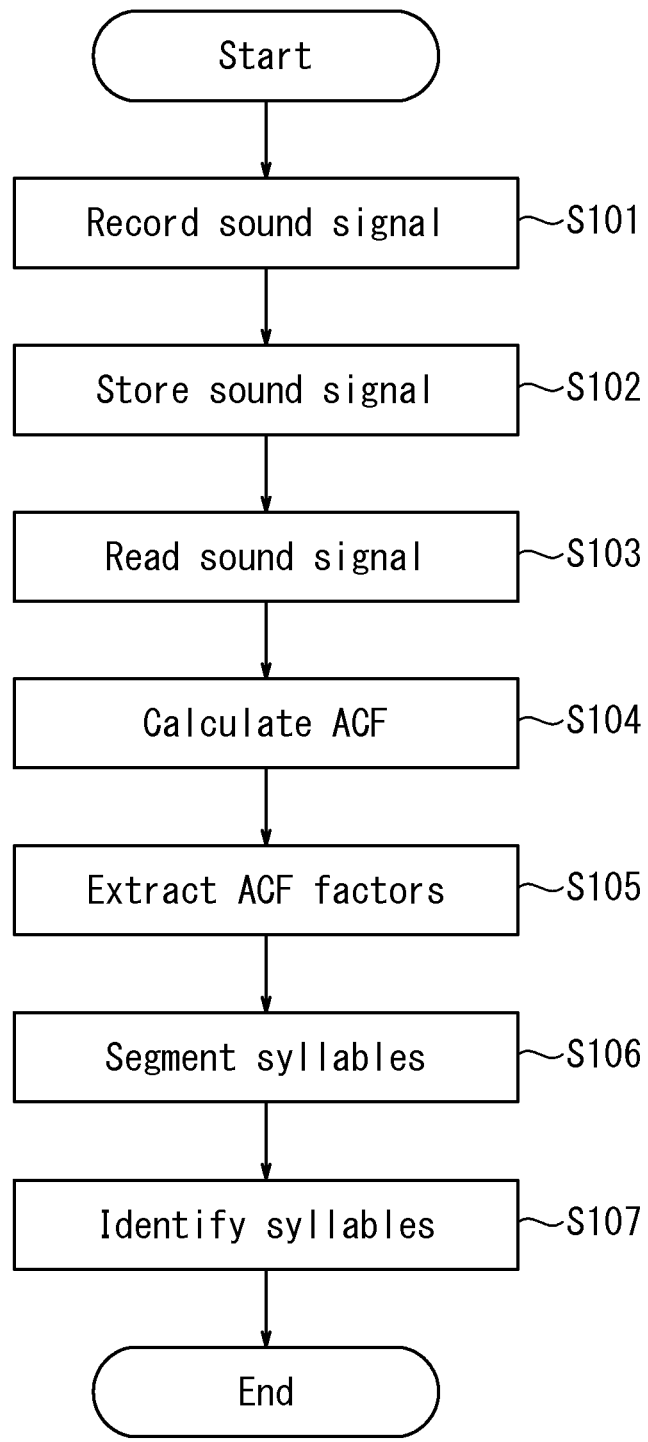
FIG. 2 is a flowchart showing a method for recognizing speech in accordance with an embodiment.

FIG. 2 is a flowchart showing a method for recognizing speech in accordance with an embodiment.

First, speech signals are recorded with the recording unit 10 (step S101). The recorded speech signals are fed through the low-pass filter 12 to the AD converter 14 to be converted to digital signals, and the post-digital conversion speech signals are stored in the storage unit 18 in the computer 16 (step S102).

The ACF calculating unit 20 reads out the speech signals from the storage unit 18 (step S103), and then calculates the running autocorrelation functions of the speech signals with the A-weighting network being applied (step S104).

The calculated ACF is supplied to the ACF factor extracting unit 22 and ACF factors are extracted (step S105).

The speech signals are segmented into syllables based on the ACF factors by the segmentation unit 24 (step S106).

Then, the ACF factors of the speech signal obtained in the above-mentioned process are compared with a template that is stored in the database 28, and syllables are identified (step S107).

The following is a description of ACF calculation method.

Figure 3:
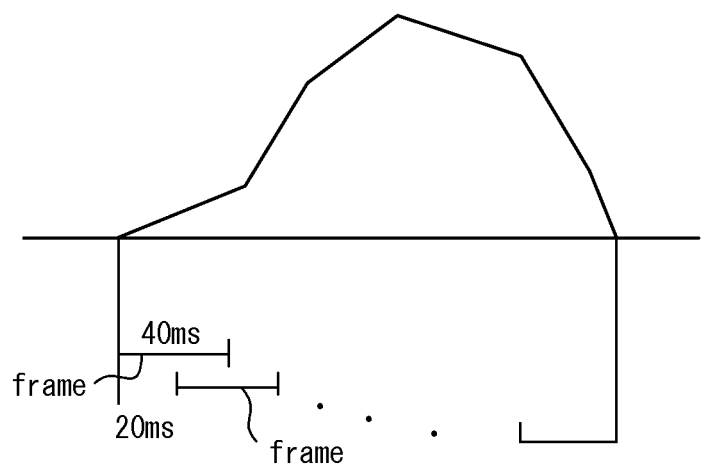
FIG. 3 is a conceptual diagram for describing a method of calculating a running ACF.

FIG. 3 is a conceptual diagram for describing a method of calculating a running ACF.

As shown in FIG. 3, running ACF for the target speech signals is calculated for short-period segments (hereinafter "frames"). This method is chosen because speech signals characteristics vary over time. An ACF integral section 2T (frame) is recommended to be about 30 times as long as the minimum value of the effective duration time $(\tau_e)_{min}$.

A frame length of several milliseconds to several tens of milliseconds is employed when analyzing speech, and adjacent frames are set to be mutually overlapping. In this embodiment, the frame length is set at 40 ms, with the frames overlapping every 20 ms.

The unnormalized running ACF is given by $$\Phi_p(\tau) = \Phi_p(\tau; t, T) = \frac{1}{2}\int_{t-T}^{t+T} p'(t)p'(t+\tau)dt \quad \text{[Math. 1]}$$

where p'(t) indicates a signal that is the result of the A-weighting network being applied to the collected speech signals p(t).

The normalized running ACF is given by $$\phi_p(\tau) = \phi_p(\tau; t, T) = \frac{\Phi_p(\tau; t, T)}{[\Phi_p(0; t, T)\Phi_p(0; \tau+t, T)]^{\frac{1}{2}}} \quad \text{[Math. 2]}$$

The normalized running ACF value at $\tau=0$, i.e. $\phi_p(0)$, is 1.0.

Five independent temporal factors are extracted from each 2T-duration frame of the running ACF.

Listening level LL for each frame is given by $$LL = 10\log\frac{\Phi_p(0)}{\Phi_{Ref}(0)} \quad \text{[Math. 3]}$$

where $\Phi_{Ref}(0)$ is the squared reference sound pressure level of 20 µPa.

Figure 4:
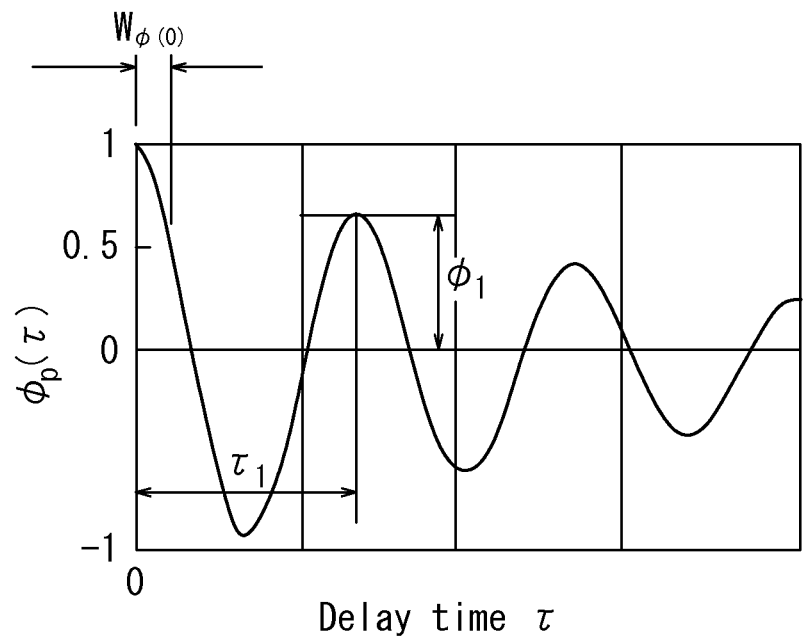
FIG. 4 is a graph plotting values of the normalized ACF on a vertical axis and values of the delay time on a horizontal axis.

FIG. 4 is a graph plotting values of the normalized ACF on a vertical axis and values of the delay time on a horizontal axis.

As shown in FIG. 4, factor $W_{\phi(0)}$ is the width of ACF amplitude $\phi(\tau)$ around its zero-delay origin, defined by the time delay at which the ACF first reaches its half-maximal value of $\phi(\tau)=0.5$. The ACF begin an even function, this peak is symmetric about the zero lag point. The factor $W_{\phi(0)}$ reflects spectral tilt or timbre "brightness", i.e. the relative weight of low and high frequencies of the speech signal, which is an important timbre dimension. If $W_{\phi(0)} \sim 1.0$ ms, then a sound is perceived as soft, whereas, on the contrary if $W_{\phi(0)} < 0.5$ ms, then it is usually perceived as hard and even harsh.

Factor $W_{\phi(0)max}$ is the maximum value of $W_{\phi(0)}$.

As shown in FIG. 4, factor $\tau 1$ is the delay time of the non-zero lag of the first major maximum in the ACF peaks, and closely corresponds to the pitch period. The pitch frequency is simply given by $1/\tau 1$.

As shown in FIG. 4, factor $\phi 1$ is the relative magnitude of this first major maximum normalized in the ACF peaks, the ACF amplitude at $\tau=\tau 1$, and it is closely associated with pitch strength.

Factor $\Delta\phi 1/\Delta t$ is the rate of the pitch strength change.

Figure 5:
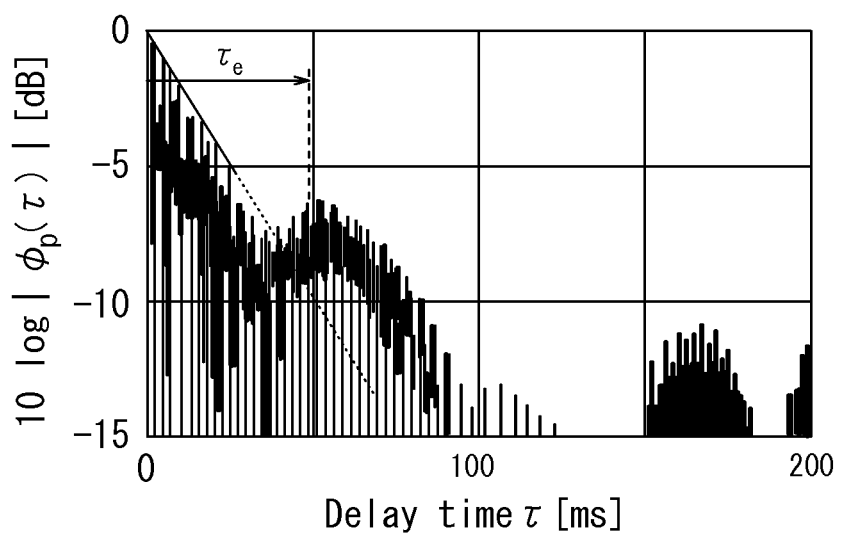
FIG. 5 is a graph plotting absolute values of logarithm of the normalized ACF on a vertical axis and the delay time on a horizontal axis.

FIG. 5 is a graph plotting absolute values of logarithm of the normalized ACF on a vertical axis and the delay time on a horizontal axis.

As shown in FIG. 5, factor $\tau_e$ is the effective duration of the envelope of the normalized ACF. Effective duration $\tau_e$ is defined by the delay at which the envelope declines to 10% of its maximal, zero-lag value. Effective duration quantifies the temporal duration over which the signal pattern is repetitive and/or periodic. For instance, for completely periodic sounds such as pure tones or harmonic complex tones, the value of $\tau_e$ is infinity, whereas for completely aperiodic white noise, $\tau_e=0$. In the typical case of a slowly time-varying signal, the ACF envelope decays exponentially. Here the value of $\tau_e$ is obtained by fitting a straight line to the ACF peaks and extrapolating the line to obtain the delay time at which the ACF $\phi(\tau)=0.1$.

Effective duration is an indication of acoustic contrast, i.e. how fast signals are changing. A minimum value of effective duration $(\tau_e)_{min}$ observed at a particular frame, i.e. the shortest effective duration, indicates an abrupt change in the sound signal. A long effective duration, and a correspondingly high value of $\tau_e$ indicate that the sound is highly repetitive. Although sound pressure level (listening level) is the primary determinant of loudness, all other factors held constant, effective duration can also weakly influence loudness. In fact, when effective duration is long, and the $\tau_e$ value is maximal, as with a pure tone, then perceived loudness is somewhat increased.

The following is a description of a method for identifying syllables by comparing the ACF factors of the input speech signal with the template.

Identification of actual syllables may be carried out by the total minimum distance between distance of each factor of the actual syllables of the template and analyzed factors as expressed below. For example, six distances may be used to calculate the total distance. As an example, distances due to each of six factors extracted from the running ACF for each actual syllable are obtained by following formulae:

$$D_{LLmax} = |(LL_{max})^T - (LL_{max})^X| \quad \text{[Math. 4]}$$

$$D_{duration} = |(n)^T - (n)^X| \quad \text{[Math. 5]}$$

$$D_{\tau e} = |\log(\tau_e)_{min}{}^T - \log(\tau_e)_{min}{}^X| \quad \text{[Math. 6]}$$

$$D_{\tau 1} = |\log(\tau 1)^T - \log(\tau 1)^X| \quad \text{[Math. 7]}$$

$$D_{\Delta\phi 1/\Delta t} = |(\Delta\phi 1/\Delta t)^T - (\Delta\phi 1/\Delta t)^X| \quad \text{[Math. 8]}$$

$$D_{W\phi(0)} = |\log(W_{\phi(0)})^T - \log(W_{\phi(0)})^X| \quad \text{[Math. 9]}$$

where T signifies the template factor and X is a factor of unknown syllable.

For example, when the above six distances are used, the total distance may be given by $$D = aD_{LLmax} + bD_{duration} + cD_{\tau e} + dD_{\tau 1} + eD_{\phi 1} + fD_{\Delta\phi 1/\Delta t} + gD_{W\phi(0)} \quad \text{[Math. 10]}$$

where coefficients "a" through "g" are weighting coefficients of the six factors that can be obtained by the multiple regression maximizing the syllables recognition.

The coefficients may be determined in advance by collecting a number of data for syllables from speech signals pronounced by a number of different peoples, according to purpose of a system to be applied, such as, for example, instantaneous speech translation between two different languages, record of discussion in a conference, communication between man and machine, and ticket selling system of trains and buses.

The template for which the calculated total distance D is smallest is judged to be the syllable of the input signal.

Example 1

Single Vowels

The major Japanese syllables consist of a matrix with five vowels, /a/, /i/, /u/, /e/ and /o/, and nine consonants, k, s, t, n, h, m, y, r, and w. In this example, the ACF factors extracted from five Japanese vowels, /a/, /i/, /u/, /e/, and /o/, are shown.

Figure 6A:
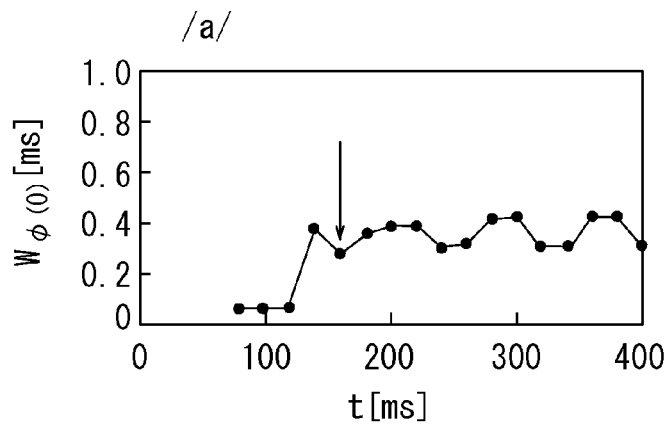
FIG. 6A is a graph of Japanese vowel /a/ plotting $W_{\phi(0)}$ on a vertical axis and the time on a horizontal axis.
Figure 6B:
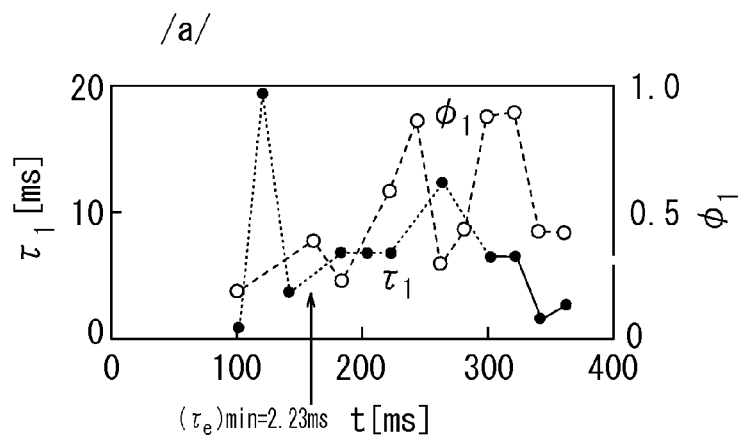
FIG. 6B is a graph of Japanese vowel /a/ plotting $\tau_1$ on a left vertical axis, $\phi_1$ on a right vertical axis and the time on a horizontal axis.
Figure 6C:
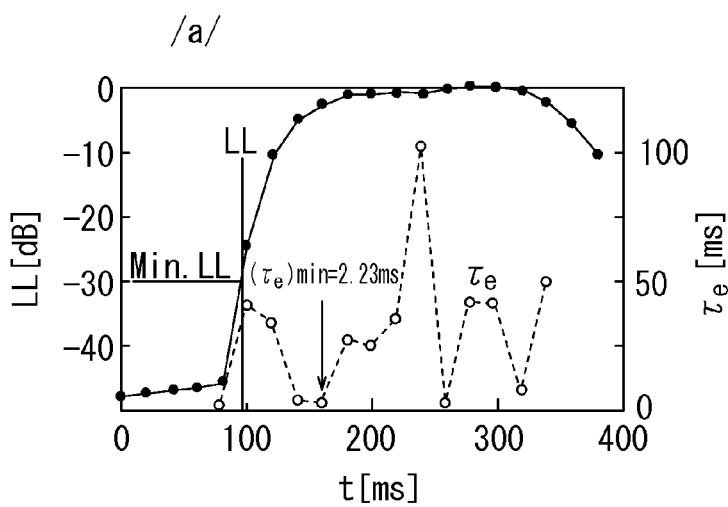
FIG. 6C is a graph of Japanese vowel plotting LL on a left vertical axis, $\tau_e$ on a right vertical axis and the time on a horizontal axis.

Japanese vowels /a/, /i/, /u/, /e/, and /o/ were separately pronounced. The five temporal factors were calculated from the running ACF as a function of time, using an integration window of 40 ms and a running frame step size of 20 ms. The trajectories of factor values for the vowel /a/ are shown in FIGS. 6A-6C. Values were calculated for listening levels within 30 dB of the maximum level (LL>−30 dB re: $LL_{max}$=0 dB) and with 16 bit sampling at 16 kHz.

FIG. 6A is a graph of Japanese vowel /a/ plotting $W_{\phi(0)}$ on a vertical axis and the time on a horizontal axis. FIG. 6B is a graph of Japanese vowel /a/ plotting $\tau 1$ on a left vertical axis, $\phi 1$ on a right vertical axis and the time on a horizontal axis, where filled circle represents $\tau 1$, and open circle represents $\phi 1$. FIG. 6C is a graph of Japanese vowel plotting LL on a left vertical axis, $\tau_e$ on a right vertical axis and the time on a horizontal axis, where filled circle represents LL, and open circle represents $\tau_e$.

In all figures in this application, arrows signify the time at which the minimum value of the effective duration ($\tau_e$) of each vowel or CV syllable was observed. This time point of minimal effective duration indicates the time at which the signal is changing most rapidly.

Remarkably, the times of the first minimal effective duration ($\tau_e$)$_{min}$ were always observed in the initial part of all the vowels. Thus, the trajectory of effective duration can indicate a specific time that separates the initial, variable-F0 vowel segment from the later, stable-F0 part. Even if a vowel is pronounced with short duration, it can nevertheless be perceived as the same vowel, suggesting that the initial segment bounded by ($\tau_e$)$_{min}$ contains information sufficient for recognition.

The factor $\tau 1$ corresponds to the pitch period, 1/F0, and thus pitch frequency is 1/$\tau 1$ Hz. Voice pitch was not constant as a function of time after ($\tau_e$)$_{min}$, i.e., during the stationary part of the vowel In the initial, variable segment before ($\tau_e$)$_{min}$, $\tau 1$ showed large and/or fluctuating values.

The factor $W_{\phi(0)}$ also showed fluctuations just after ($\tau_e$)$_{min}$. A larger value of $W_{\phi(0)}$ signifies relatively more energy in low frequency components, whereas a small value signifies relatively more energy in higher frequencies. A relationship between fluctuations of $W_{\phi(0)}$ and pitch strength $\phi 1$ was apparent: pitch strength lessened when the spectrum tilted towards higher frequencies.

FIG. 7 is a table that lists the values of ACF factors extracted from five Japanese vowels.

FIG. 7 lists the values of four factors for all of the vowels at two time points, at ($\tau_e$)$_{min}$ and after ($\tau_e$)$_{min}$. The first time point ($\tau_e$)$_{min}$ lies at the end of the initial variable segment, and the second time point lies in the quasi-stationary segment that follows ($\tau_e$)$_{min}$, where $\tau 1$ values have stabilized. Maximal values of $W_{\phi(0)}$ in parts of vowels, namely $W_{\phi(0)}$, are also listed in FIG. 7. Values were obtained for listening levels, LL>−30 dB, ACF integration windows, 2T=40 ms, and frame (n) time step of 20 ms. The last row indicates the $n^{th}$ frame following ($\tau_e$)$_{min}$ in which factor values were observed, e.g. n=3 is 670 ms after ($\tau_e$)$_{min}$. Pitch development speed $\Delta\phi 1/\Delta t$, indicating rate of the pitch strength change was calculated for $\Delta t$=100 ms.

Example 2

Single CV Syllables

The example of ACF factors extracted from nine CV syllables is shown below. The major Japanese syllables consist of a matrix with five vowels, /a/, /i/, /u/, /e/ and /o/, and nine consonants, k, s, t, n, h, m, y, r and w. In this example, nine consonant-vowel (CV) pairs that consisted of one of the nine consonants followed by /a/ were pronounced.

Similar to the above study, nine Japanese single CV syllables were separately pronounced. Each CV syllable consisted of an initial consonant C (/k/, /s/, /t/, /n/, /h/, /m/, /y/, /r/, or /w/) coarticulated with the vowel V /a/. For each syllable, the five temporal ACF factors were extracted from the running ACF. All of the syllables had a single peak listening level in the range within 30 dB of the maximum level.

Figure 8A:
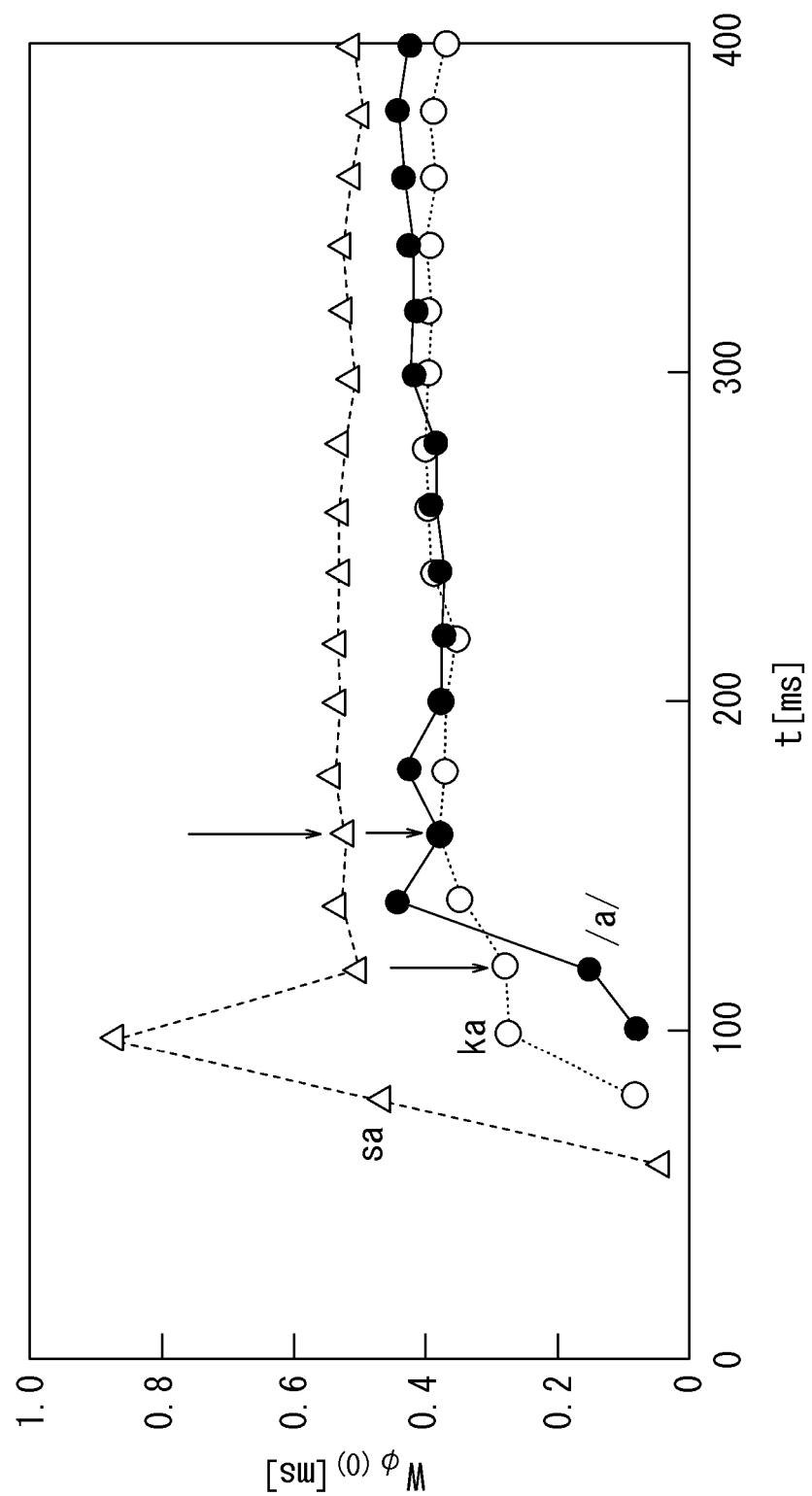
FIG. 8A is a graph of Japanese syllables /a/, /ka/ and /sa/ plotting $W_{\phi(0)}$ on a vertical axis and the time on a horizontal axis.
Figure 8C:
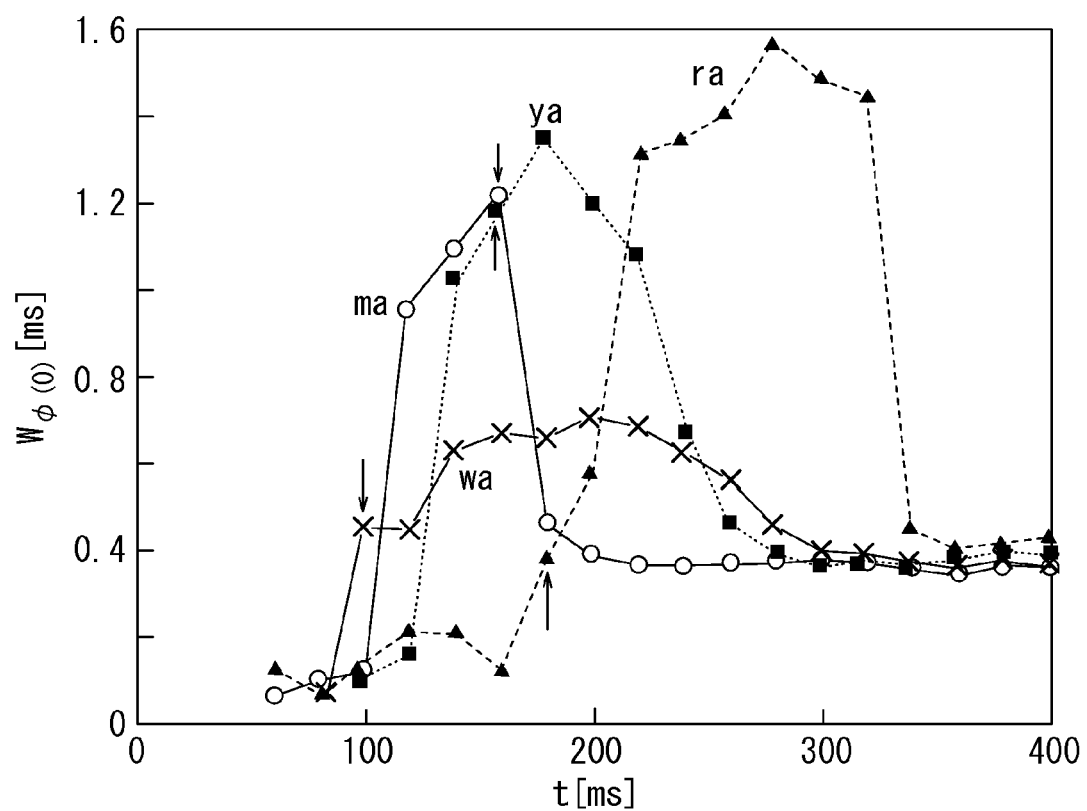
FIG. 8C is a graph of Japanese syllables /ma/, /ya/, /ra/ and /wa/ plotting $W_{\phi(0)}$ on a vertical axis and the time on a horizontal axis.

The time courses of $W_{\phi(0)}$ for the nine CV syllables and the isolated vowel /a/ are shown in FIGS. 8A-8C. FIG. 8A shows syllables /a/, /ka/ and /sa/, where filled circle represents /a/, open circle represents /ka/, and open triangle represents /sa/. FIG. 8B shows syllables /ta/, /na/ and /ha/, where open rectangle represents /ta/, open triangle represents /na/, and filled circle represents /na/. FIG. 8C shows syllables /ma/, /ya/, /ra/ and /wa/, where open circle represents /ma/, filled rectangle represents /ya/, filled triangle represents /ra/, and "x" represents /wa/.

Magnitudes and peak durations of $W_{\phi(0)}$ differed greatly across CV syllables. Remarkably, there are obvious differences between the CV syllables as to the time courses and magnitude trajectories over which $W_{\phi(0)}$ converges to the steady-state value of roughly 0.4 ms for the vowel /a/.

Figure 9A:
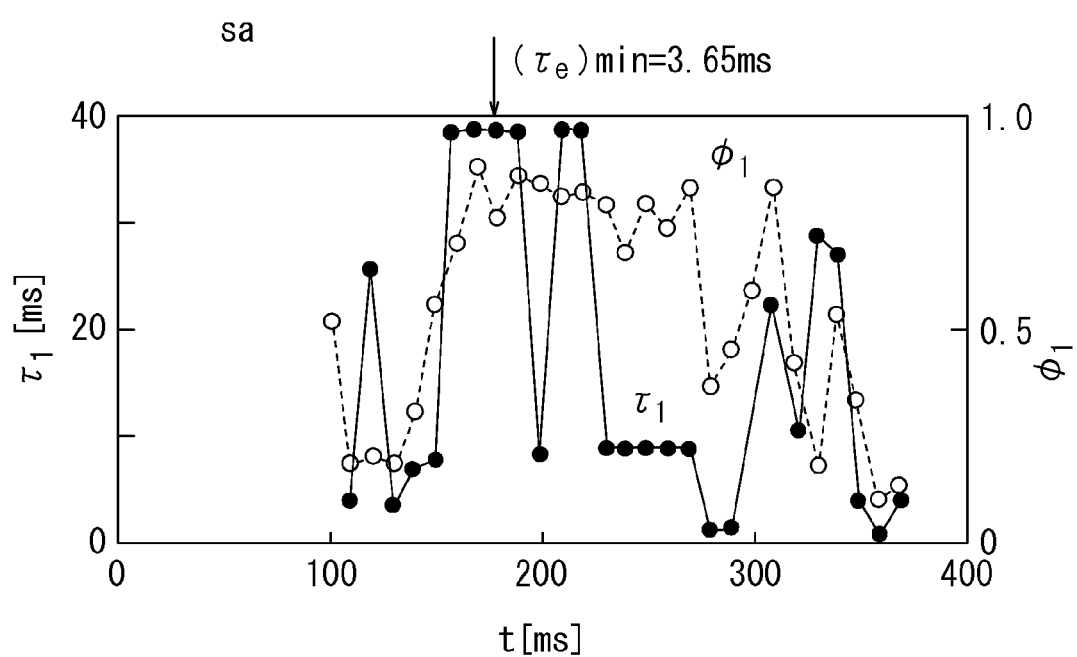
FIG. 9A is a graph of Japanese syllable /sa/ plotting τ1 on a left vertical axis, ϕ1 on a right vertical axis and the time on a horizontal axis.
Figure 9B:
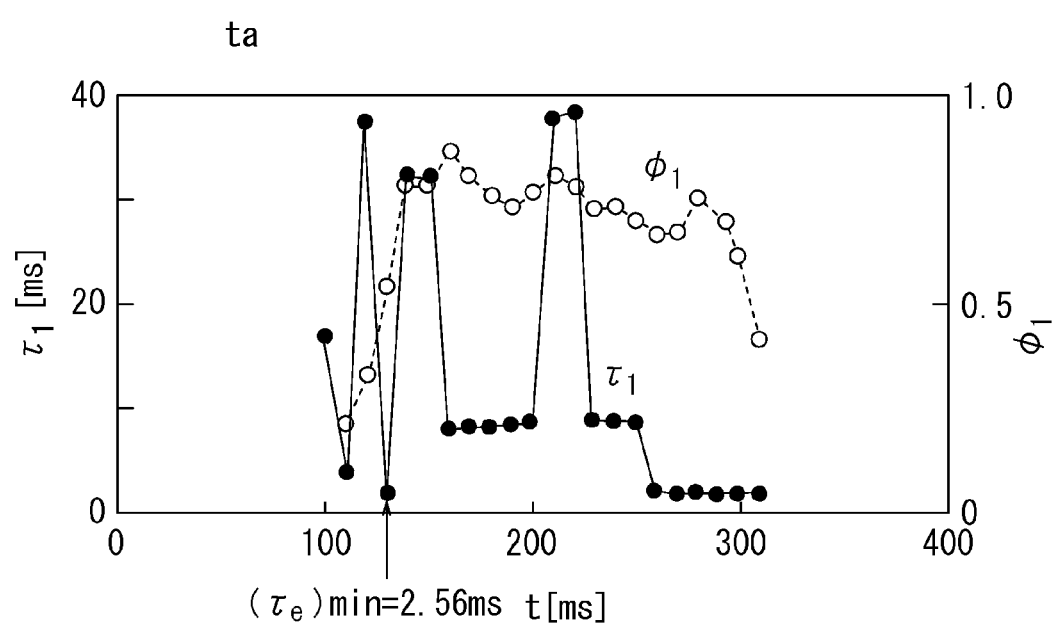
FIG. 9B is a graph of Japanese syllable /ta/ plotting τ1 on a left vertical axis, ϕ1 on a right vertical axis and the time on a horizontal axis.
Figure 9C:
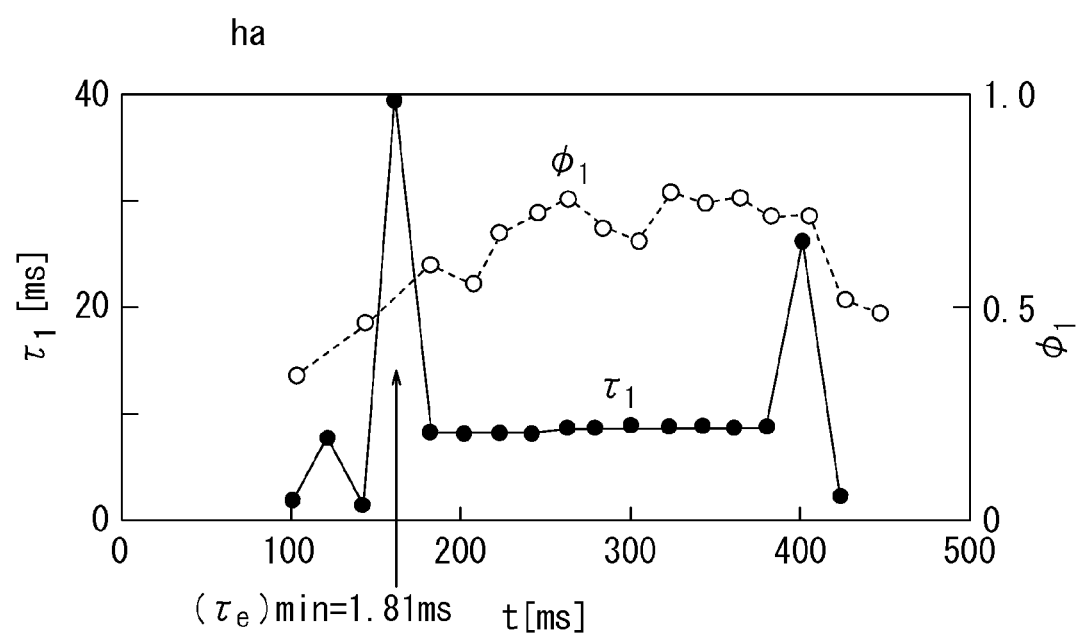
FIG. 9C is a graph of Japanese syllable /ha/ plotting τ1 on a left vertical axis, ϕ1 on a right vertical axis and the time on a horizontal axis.
Figure 9D:
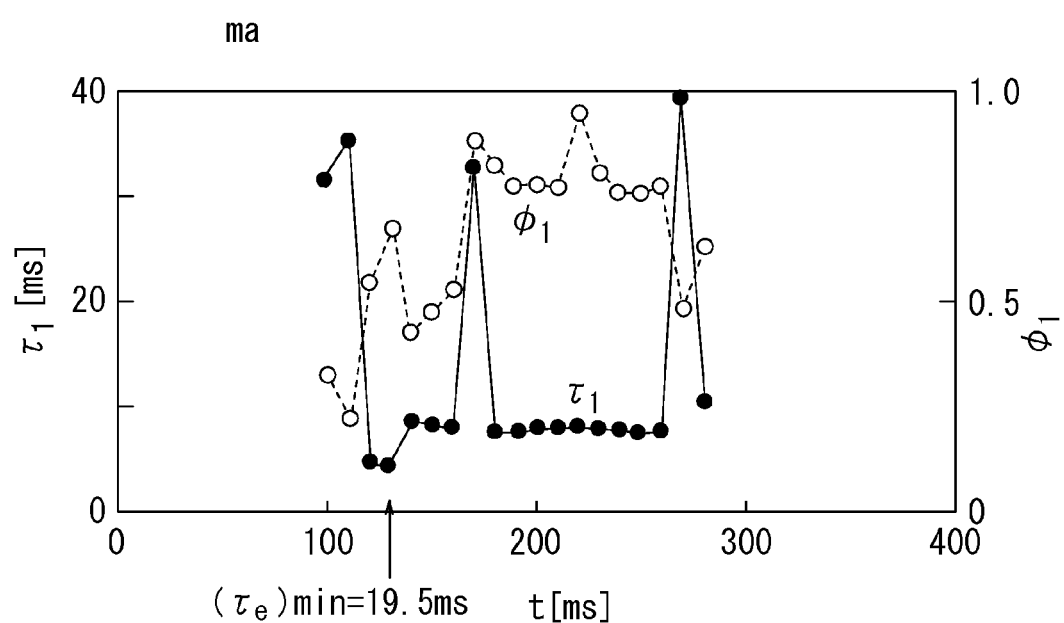
FIG. 9D is a graph of Japanese syllable /ma/ plotting τ1 on a left vertical axis, ϕ1 on a right vertical axis and the time on a horizontal axis.
Figure 9E:
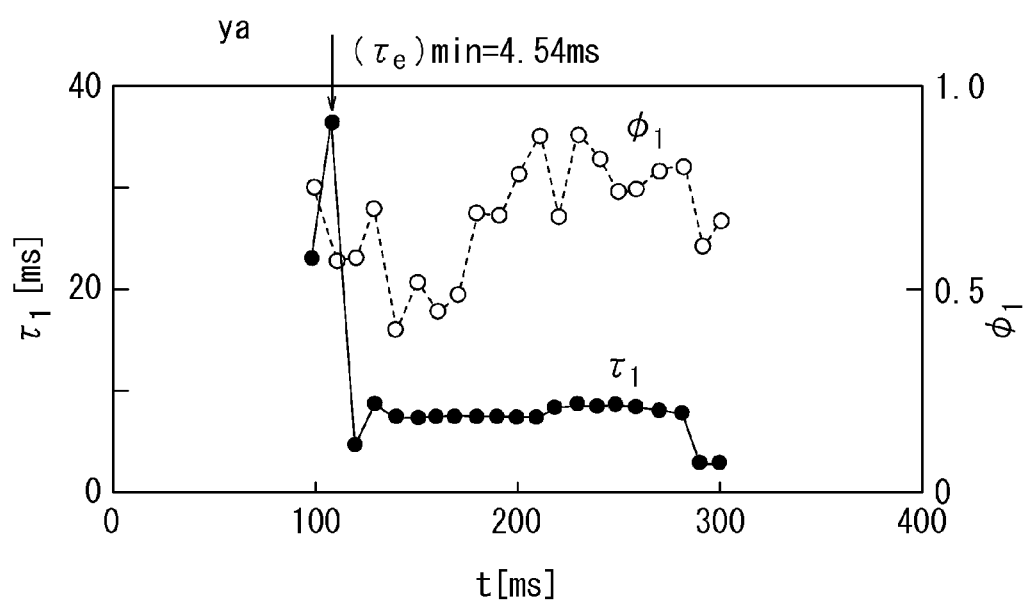
FIG. 9E is a graph of Japanese syllable /ya/ plotting τ1 on a left vertical axis, ϕ1 on a right vertical axis and the time on a horizontal axis.
Figure 9F:
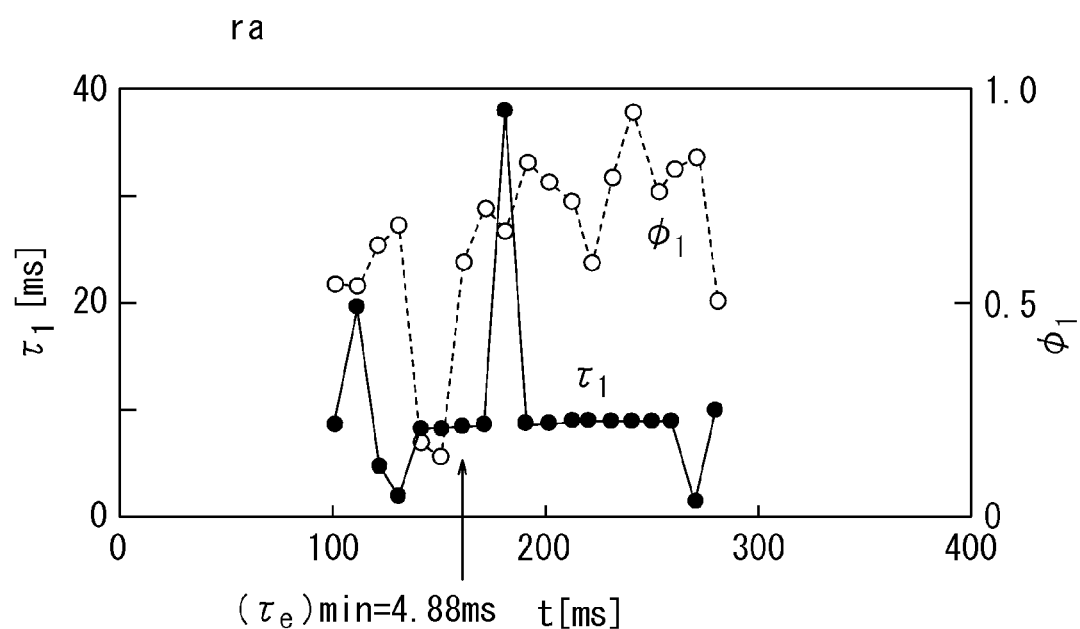
FIG. 9F is a graph of Japanese syllable /ra/ plotting τ1 on a left vertical axis, ϕ1 on a right vertical axis and the time on a horizontal axis.

FIG. 9A-9F are graphs for six Japanese CV syllables plotting $\tau 1$ on a left vertical axis, $\phi 1$ on a right vertical axis and the time on a horizontal axis. FIG. 9A shows a syllable /sa/. FIG. 9B shows a syllable /ta/. FIG. 9C shows a syllable /ha/. FIG. 9D shows a syllable /ma/. FIG. 9E shows a syllable /ya/. FIG. 9F shows a syllable /ra/. In FIGS. 9A-9F, filled circle represents $\tau 1$, and open circle represents $\phi 1$.

Dynamical development of factor $\phi 1$ (pitch strength) continued from the beginning of the syllable, through the offsets of consonants and the onset of vowels to the end of the syllable (FIGS. 9A-F). There is continuity of its time course from C to V, so that four factors just after $(\tau_e)_{min}$ may provide information related to both consonant and vowel (FIGS. 8A-8C and 9A-9F). The time of $(\tau_e)_{min}$, indicated in the plots by arrows, was always observed in initial parts of each CV, such that it can mark the boundary between consonant and vowel segments.

FIGS. 10A-10B are a table that lists five factors obtained at the time of minimal effective duration $(\tau_e)_{min}$, generally at CV boundaries (FIG. 10A), and at times in the quasi-stationary vowel segment that followed (FIG. 10B).

Figure 11:
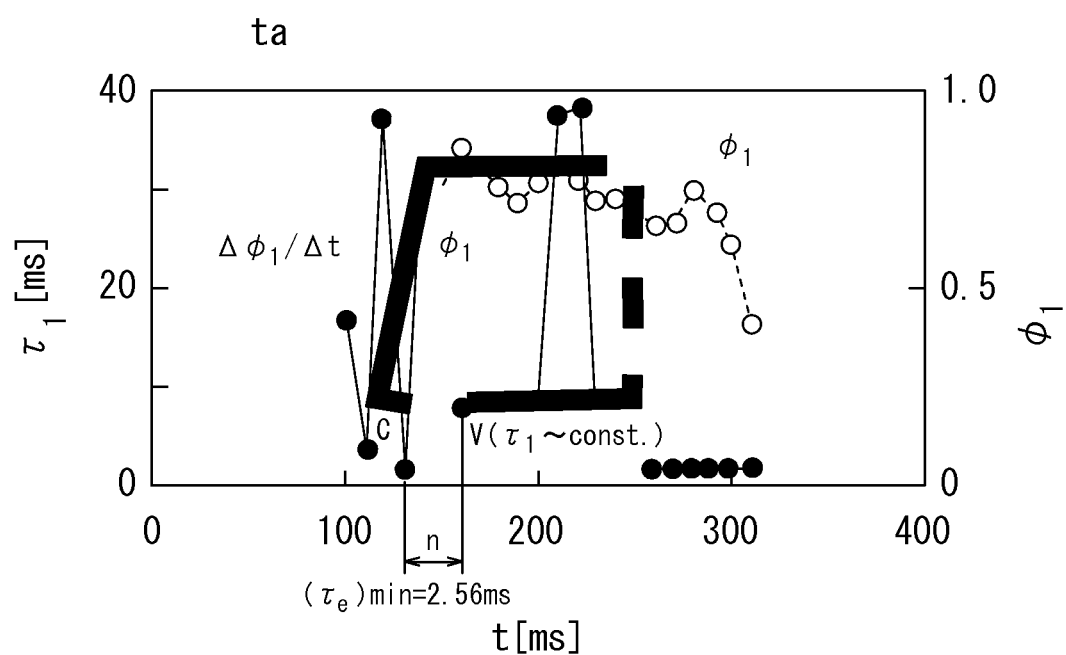
FIG. 11 is a graph of Japanese syllable /ta/ plotting τ1 on a left vertical axis, ϕ1 on a right vertical axis and the time on a horizontal axis.

Results of pitch-related factors $\tau 1$ and $\phi 1$ for CV syllables are shown in FIGS. 9A-9F. Common behavior of factors $\tau 1$ and $\phi 1$ are schematically illustrated by the heavy lines in FIG. 11, where filled circle represents $\tau 1$, and open circle represents $\phi 1$. As in FIGS. 7 and 10A-10B, the symbol n in this figure is a gap that represents the number of 20 ms frame steps between the time at $(\tau_e)_{min}$ and the time in the following vowel segment where pitch strength is higher and the pitch period $\tau 1$ has stabilized. These frame numbers (n) are reported in the bottom row of FIG. 10B, showing that $(\tau_e)_{min}$ is observed before continuous pitch of the vowel.

It was found that around the time of after $(\tau_e)_{min}$, the speed of development of pitch strength given by $\Delta\phi 1/\Delta t$ varied according to syllables (FIGS. 7, 10A-10B, and 19). For example, sa and to produce greater values of $\Delta\phi 1/\Delta t$ than any other syllables. In terms of musical timbre, $\Delta\phi 1/\Delta t$ provides a voice-pitch-based analogue of attack-decay intensity dynamics, whereas $W_{\phi(0)}$ provides an analogue of gross spectral energy distribution. In the speech context, this pitch onset dynamic might depend on the speed of pronunciation especially at the time point of voicing onset of whole CV syllables.

As mentioned above, after the n-th frame after $(\tau_e)_{min}$ and at beginnings of vowel steady-state segments, observed values for the pitch-related factor $\tau 1$ were almost constant, signifying a strong continuous pitch that is reflected in accompanying large values for the factor $\phi 1 \sim 0.8$ (pitch strength).

Variations were observed for voice pitches $1/\tau 1$ of different vowels (FIG. 7) and for the same vowel /a/ following different initial consonants (FIG. 10B) for the same speaker. It is interesting to point out that fluctuation of pitch frequencies of single vowels were relatively widely distributed, ranging from 148 Hz to 180 Hz, whereas those for vowel segments in the CV syllables were more narrowly distributed, ranging from 111 to 136 Hz. Also, the factors $W_{\phi(0)}$, $\tau 1$, and $\phi 1$ similarly fluctuated more (e.g. FIGS. 6A-6C for /a/), for the five single isolated vowels than for vowels following consonants (CV syllables), which were, in comparison, rather stable (FIGS. 8A-8C and 9A-9F). On the contrary, as listed in FIGS. 7 and 10A-10B, pitch frequencies $(1/\tau 1)$ of single syllables observed just at time $(\tau_e)_{min}$ were widely distributed over a range of 25 to 617 Hz.

Example 3

Vowel and Syllable Identification

The example of vowel and syllable identification is shown below.

In order to demonstrate potential usefulness of ACF-derived factors, discrimination of isolated vowels and CV syllables using three selected ACF factors was attempted. The three factors used were 1) $W_{\phi(0)max}$ (spectral tilt), 2) $\tau 1$ (pitch period) obtained in the quasi-stationary segment after $(\tau_e)_{min}$, and 3) $\Delta\phi 1/\Delta t$ (rate of pitch strength change).

Figure 12:
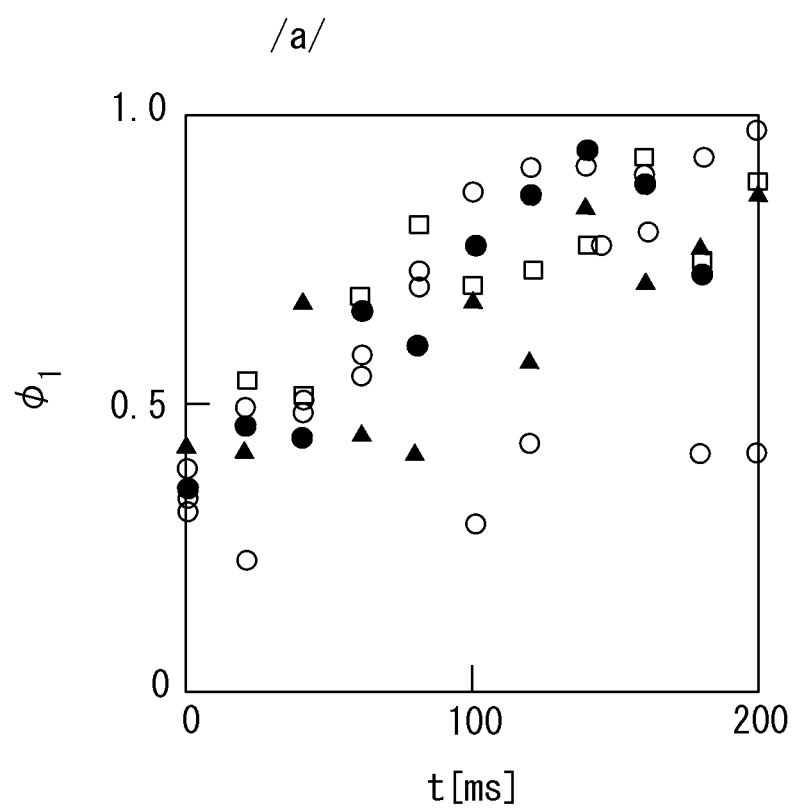
FIG. 12 is a graph of Japanese syllable /a/ plotting ϕ1 on a vertical axis and the time on a horizontal axis.

Because of the variability of the vowel features, three additional separate recordings of each of the five spoken vowels were made. As demonstrated for vowel /a/ similar results for $\Delta\phi 1/\Delta t$ were obtained across the four recording sessions (FIG. 12), and the same was true for the other vowels. The figure also includes results from the first session that were listed in FIG. 7. In FIG. 12, different symbols indicate values from four recording sessions.

All of factors including $\Delta\phi 1/\Delta t$ are listed in FIG. 19 to provide an indication of the variability of each factor analyzed. The values of factor $W_{\phi(0)max}$ listed in the tables show similarities across sessions and obvious differences across vowels. This factor therefore appears to be potentially effective for distinguishing vowels.

FIGS. 19, 20A-20C, and 21A-21D are tables. In these tables, the ACF parameter values reported were calculated at time points near the beginnings of quasi-stationary vowel segments, where the voice pitch frequency $1/\tau 1$ was most constant. The duration factor was measured by the number of 20 ms frame steps (n) during which the listening level LL was within 3 dB of its maximal value $LL_{max}$. The pitch frequency is given by $1/\tau 1$ Hz measured for the signal segments when $\phi 1 > 0.65$ (morning greetings) or $\phi 1 > 0.60$ (vowels, Haiku). $\Delta\phi 1/\Delta t$ is a rate of the pitch strength change measured for each syllable for $\Delta t = 100$ ms. Values in parentheses for $\Delta\phi 1/\Delta t$ are the averaged values over all syllables. For the Haiku, in order to reduce variability due to differences in pronunciation speed, values for $\Delta\phi 1/\Delta t$ were normalized by their average values obtained over 4 trials.

Figure 13:
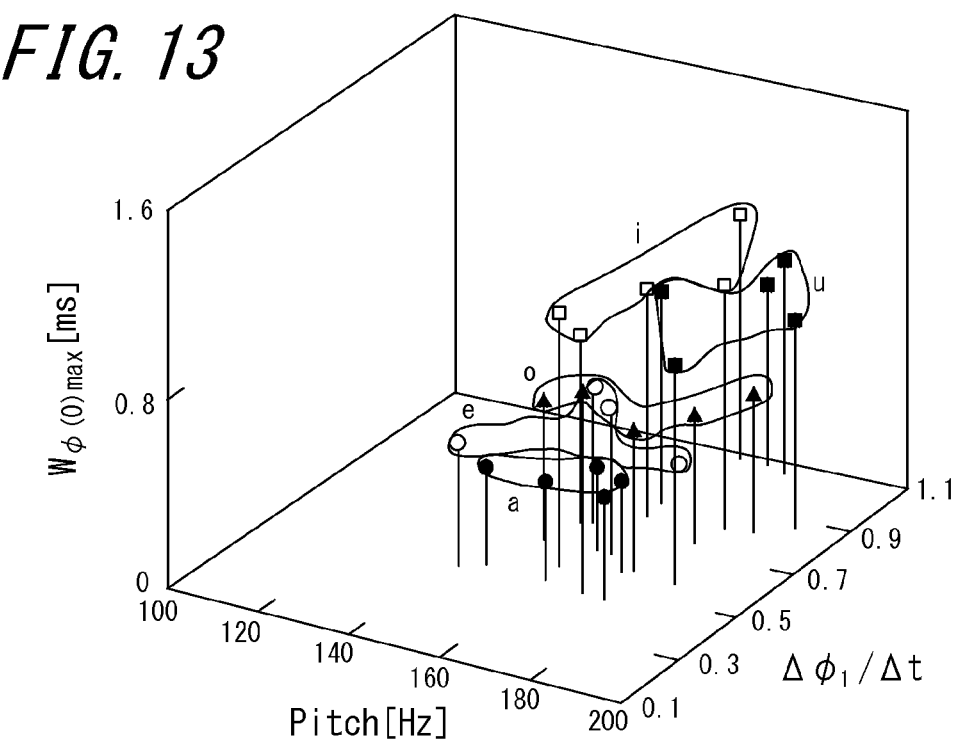
FIG. 13 is a mapping of five Japanese vowels in three-dimensional space using factors of $W_{\phi(0)max}$, pitch frequency (1/τ1) and Δϕ1/Δt.
Figure 14:
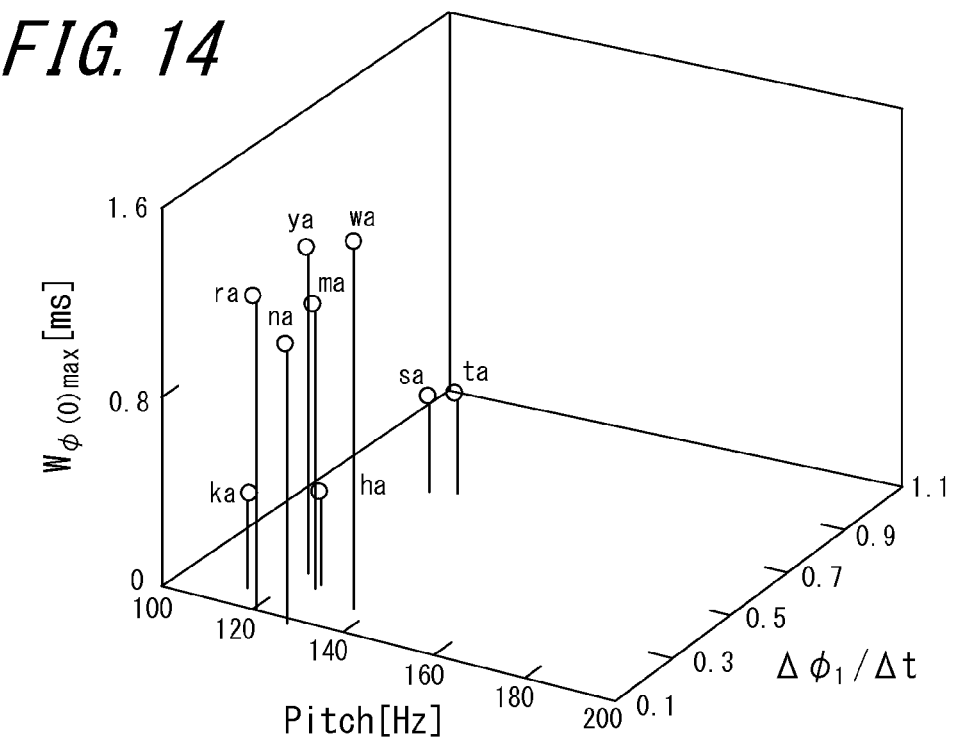
FIG. 14 is a mapping of nine Japanese CV syllables in three-dimensional space using factors of $W_{\phi(0)max}$, pitch frequency (1/τ1) and Δϕ1/Δt.

FIG. 13 is a mapping of five Japanese vowels in the three-dimensional feature space using factors $W_{\phi(0)max}$ (spectral tilt), $\Delta\phi 1/\Delta t$ (rate of pitch strength change), and $1/\tau 1$ (pitch frequency), where filled circle represents /a/, open rectangle represents /i/, filled rectangle represents /u/, open circle represents /e/, and filled triangle represents /o/. FIG. 14 is a mapping of nine Japanese CV syllables in the three-dimensional feature space using factors $W_{\phi(0)max}$, $\Delta\phi 1/$ $\Delta t$, and $1/\tau 1$. The vowels and CV syllables appear to be well separated on this basis, even though three ACF factors are utilized.

Example 4

Analysis of Three Greetings in Three Languages

The analysis of three morning greeting words is shown below.

Figure 15A:
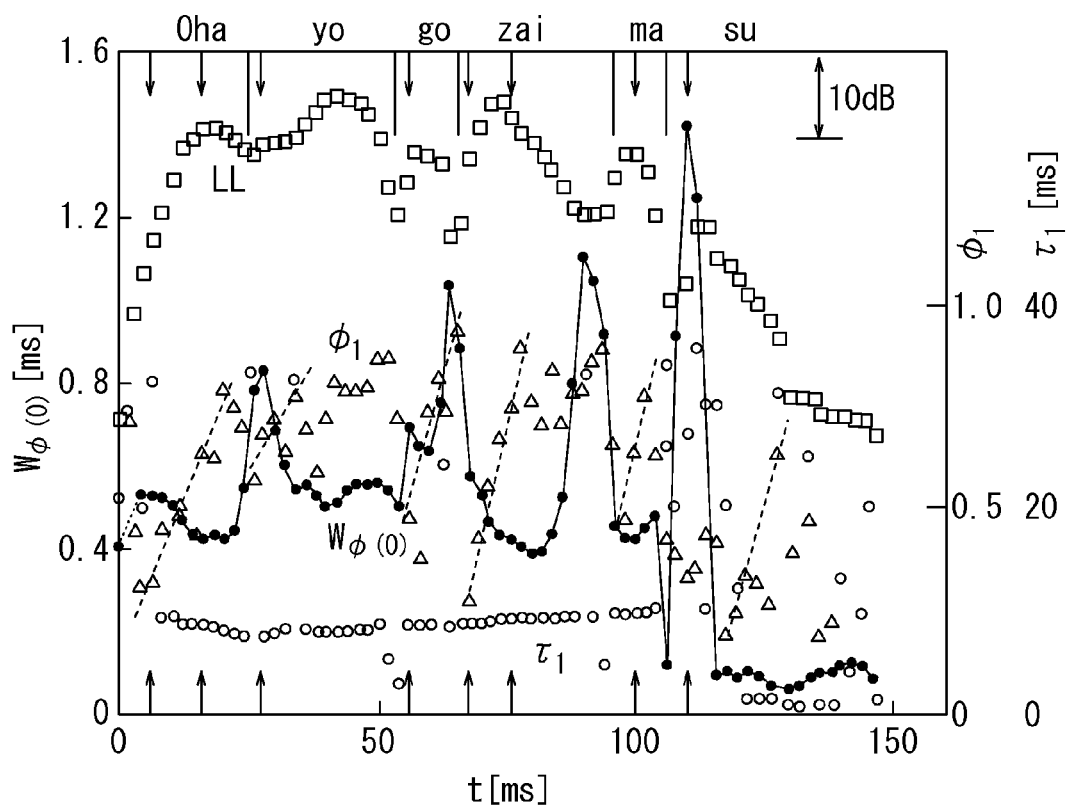
FIG. 15A is a graph of ACF factors extracted from Japanese greeting phrase "Ohayo-gozaimasu" plotting $W_{\phi(0)}$ on a left vertical axis, ϕ1 and τ1 on a right vertical axis, and the time on a horizontal axis.
Figure 15B:
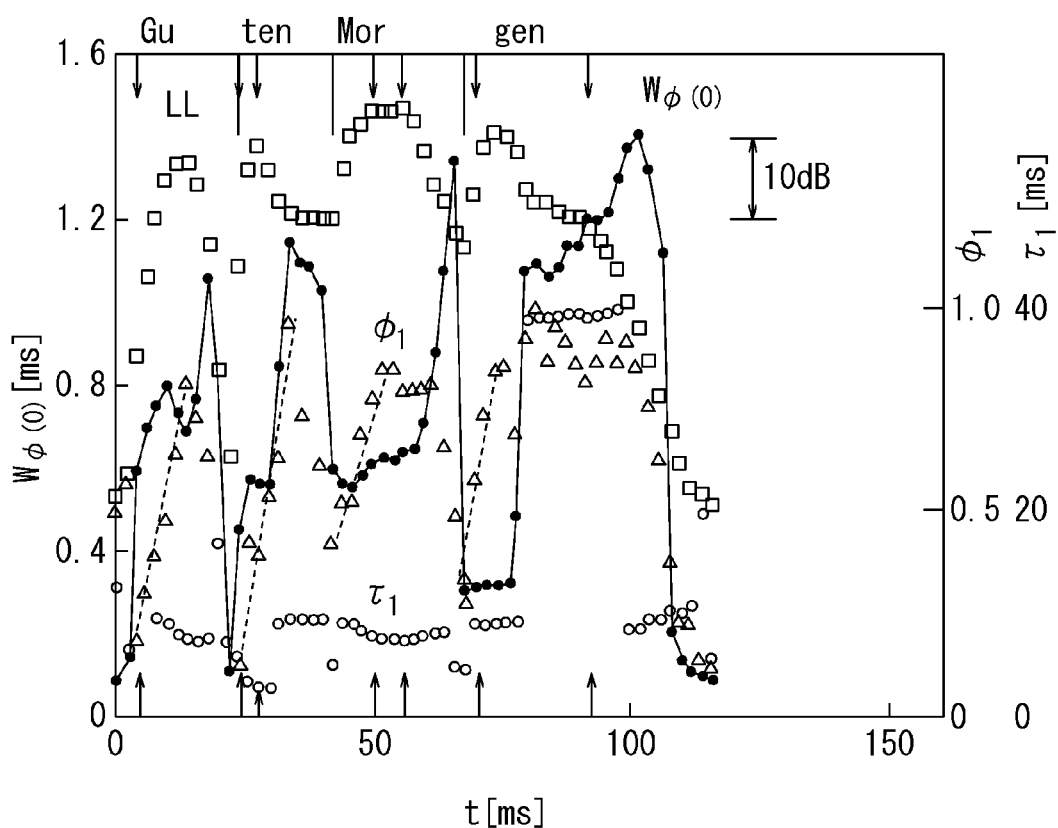
FIG. 15B is a graph of ACF factors extracted from German greeting phrase "Guten Morgen" plotting $W_{\phi(0)}$ on a left vertical axis, ϕ1 and τ1 on a right vertical axis, and the time on a horizontal axis.
Figure 15C:
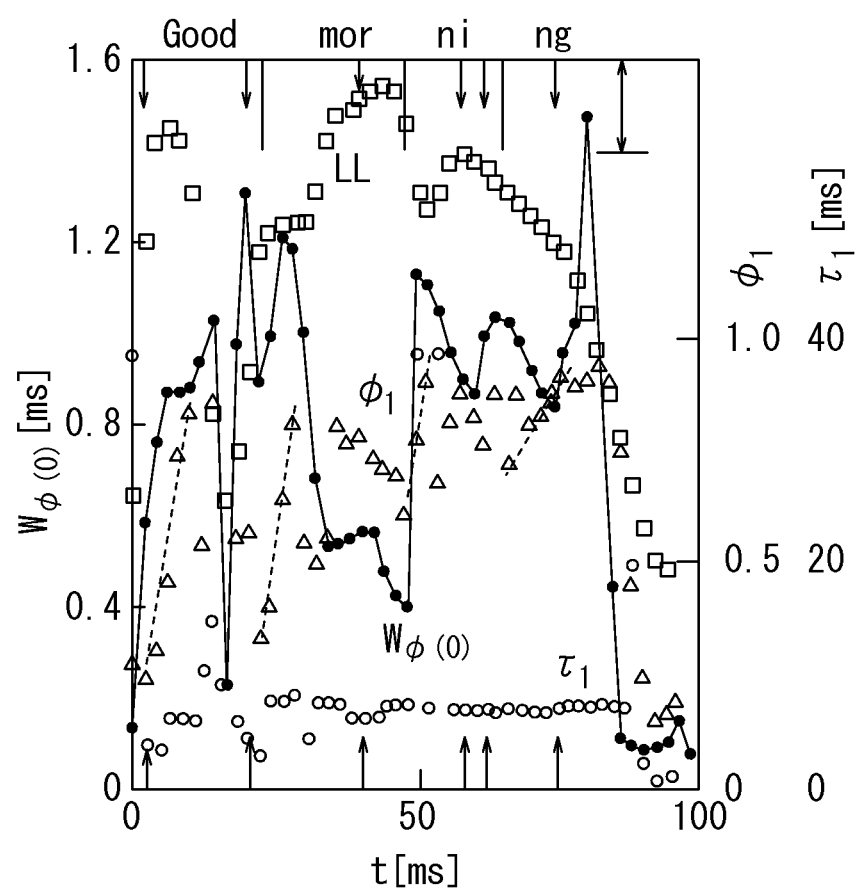
FIG. 15C is a graph of ACF factors extracted from English greeting phrase "Good morning" plotting $W_{\phi(0)}$ on a left vertical axis, ϕ1 and τ1 on a right vertical axis, and the time on a horizontal axis.

Common spoken greeting phrases in three languages were analyzed: "Ohayo-gozaimasu" (Japanese), "Good morning" (English) and "Guten Morgen" (German). Temporal factors were extracted from the running ACF. Running values for spectral tilt $W_{\phi(0)max}$ and the two pitch-related factors $\tau 1$, and $\phi 1$ are plotted in FIGS. 15A-15C, and listed in FIGS. 20A-20C. In FIGS. 15A-15C, filled circle represents $W_{\phi(0)}$, open triangle represents $\phi 1$, open circle represents $\tau 1$, and open rectangle represents LL. As in the previous examples, segmentation of actual syllables could be easily performed by all of five factors as a function of time. Arrows indicate the times of minimum effective duration (which were observed at syllable onsets and/or near listening level maxima.

Figure 16:
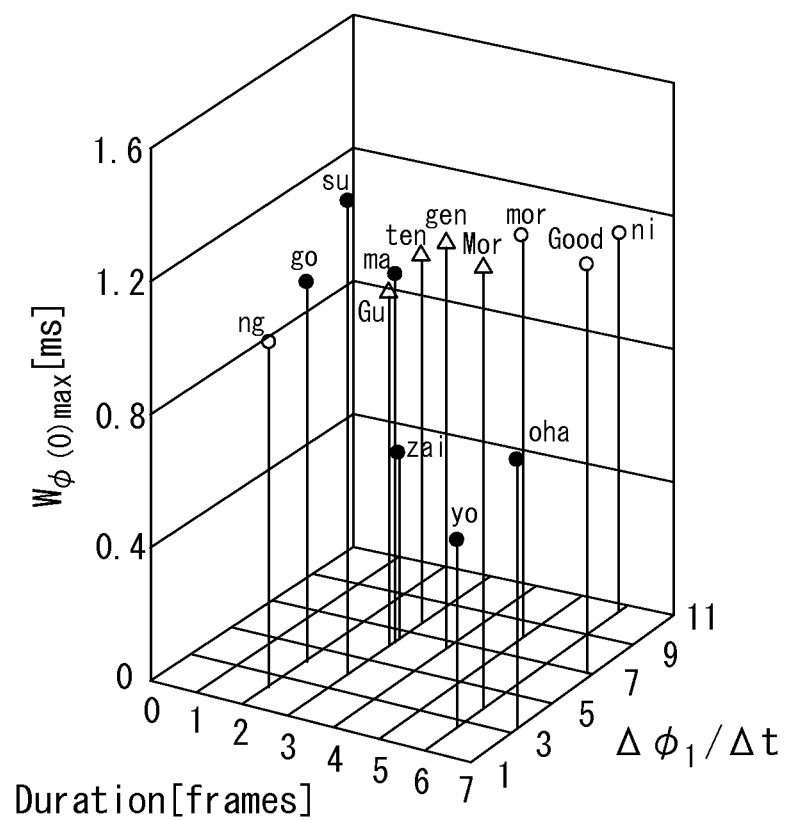
FIG. 16 is a mapping of three greeting phrases in three-dimensional space using factors of $W_{\phi(0)max}$, duration and Δϕ1/Δt.

FIG. 16 is a mapping of three greeting phrases in three-dimensional space using factors of $W_{\phi(0)max}$, duration and $\Delta\phi 1/\Delta t$, where filled circle represents Japanese morning greeting "Ohayo gozaimasu", open circle represents English morning greeting "Good morning", and open triangle represents German morning greeting "Guten Morgen". Duration of signals is defined by $-3$ dB from the maximum sound level. Even though only a single trial for the different languages was performed, each syllable is well separated, and thus identification on the basis of these factors appears plausible. It is interesting, for example, that English "mor" and German "Mor" is mapped near to each other, due to their similar pronunciation.

Example 5

Analysis of a Haiku Phrase

The analysis of Japanese short poem is shown below.

Figure 17A:
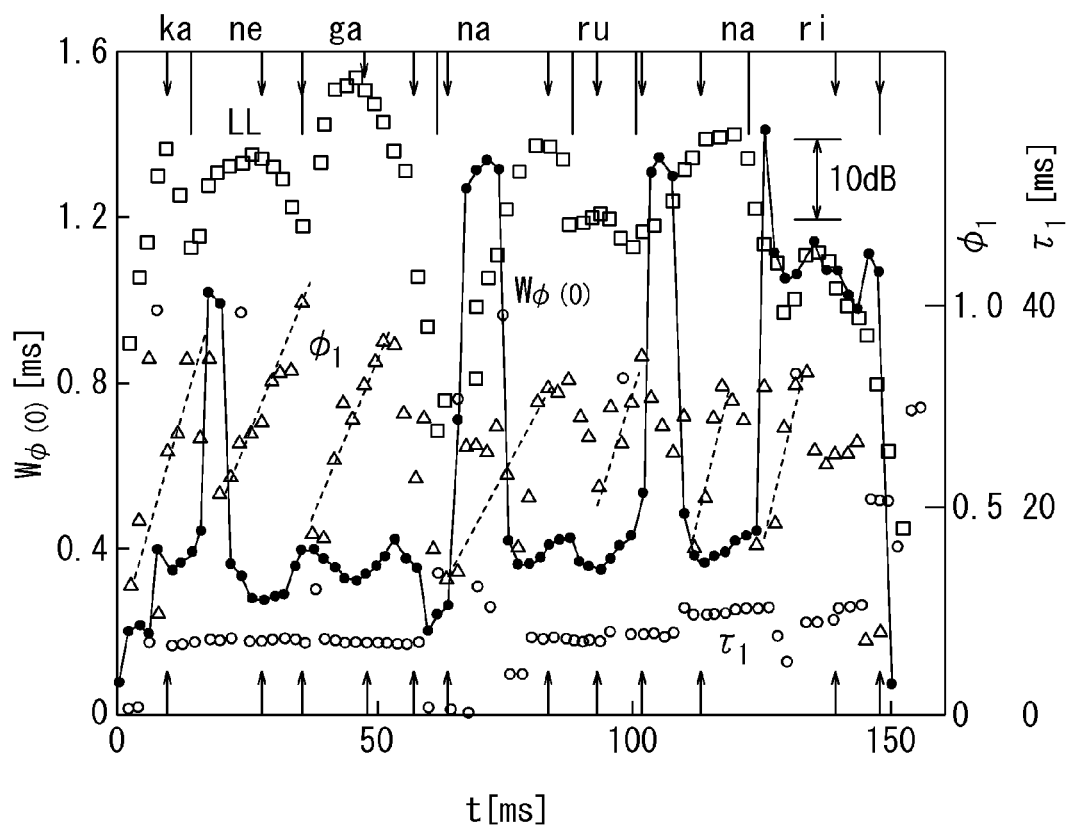
FIG. 17A is a graph of ACF factors extracted from first recorded Japanese Haiku phrase "kaneganarunari" plotting $W_{\phi(0)}$ on a left vertical axis, ϕ1 and τ1 on a right vertical axis, and the time on a horizontal axis.
Figure 17B:
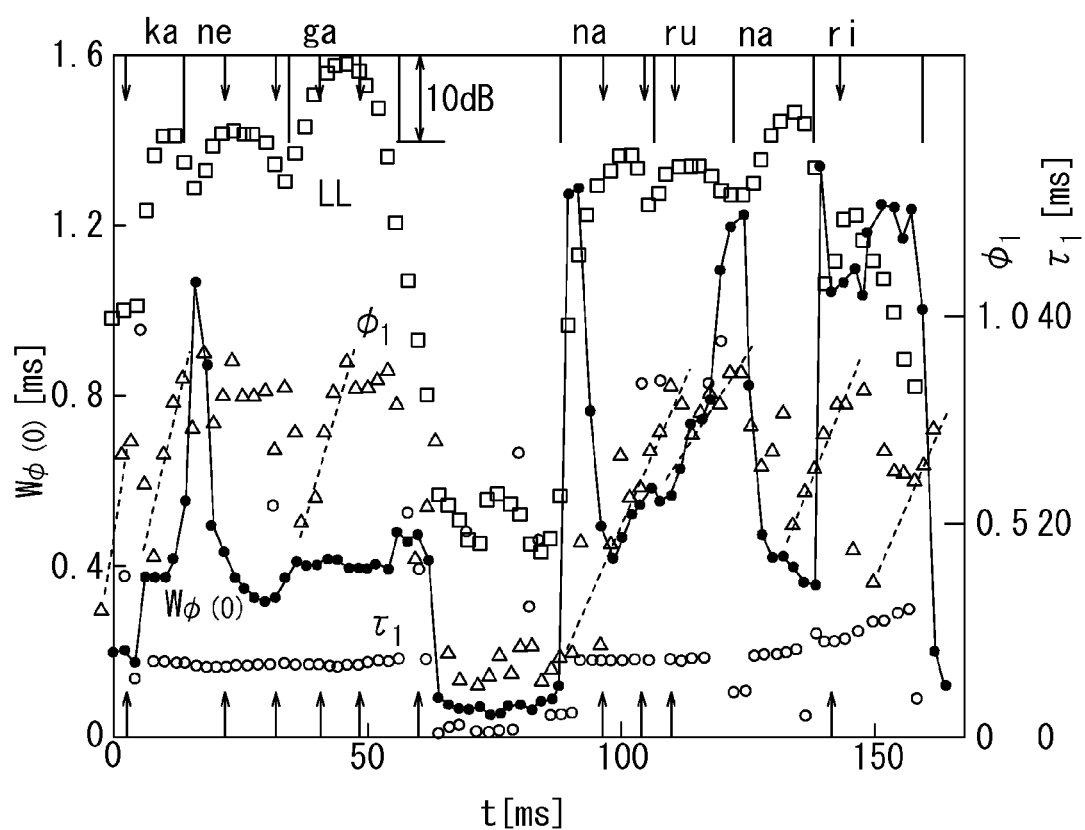
FIG. 17B is a graph of ACF factors extracted from second recorded Japanese Haiku phrase "kaneganarunari" plotting $W_{\phi(0)}$ on a left vertical axis, ϕ1 and τ1 on a right vertical axis, and the time on a horizontal axis.

The phrase, "kane ga narunari," of a Meiji-era poem by Shiki Masaoka was spoken, twice in quiet condition and twice in noise condition. FIGS. 17A-17B shows the time courses of five ACF-derived factors for two spoken repetitions of the phrase in quiet condition, where filled circle represents $W_{\phi(0)}$, open triangle represents $\phi 1$, open circle represents $\tau 1$, and open rectangle represents LL. FIG. 17A is a graph of first recording. FIG. 17B is a graph of second recording. FIGS. 21A-21D provide the lists of observed numerical values at different time points. At the upper part of figures, vertical lines without arrows indicate segmentation of "actual" syllables shown at the top of the plots.

These lines have been determined by:
1) Local dip of factor listening level LL;
2) Each syllable should include one or two minimum values of effective duration $(\tau_e)_{min}$, which reflect the times when sound patterns are most rapidly changing. Here vertical lines with arrows signify transition times that are observed in initial segments and/or near listening level maxima;
3) Linear regression from several values of factor $\Delta\phi 1/\Delta t$, which reflects the rate of pitch strength change over a 100 ms time span.
4) Time at which sudden changes of factor $\tau 1$ occur and;
5) Time at which sudden changes of factor $W_{\phi(0)}$ occur. A larger value of $W_{\phi(0)}$ signifies relatively greater energy in low frequency registers, whereas a smaller value reflects relatively more energy in higher frequencies.

These parameters permit a computer program to automatically segment the syllables.

In order to test the robustness of segmentation using ACF-based factors, two additional recordings of the spoken Haiku phrase were made with noise condition in which noise are added from an FM radio mistuned without selecting any station. The noise levels were about $-52$ dB in reference to $LL_{max}$.

The values for ACF-derived factors in noise condition are given in FIGS. 21C-21D. As with other stimuli, the values reported in the tables were obtained just after $(\tau_e)_{min}$ in the quasi-stationary portion of each vowel, where the pitch period $\tau 1$ is most stable. In addition to the factors analyzed in the previous examples, such as $(\tau_e)_{min}$ (minimum value of effective duration $\tau_e$), $\tau 1$ (pitch period), $\phi 1$ (pitch strength), and $\Delta\phi 1/\Delta t$ (rate of pitch strength change), several other measures were also considered.

These additional factors analyzed were:
1) listening level relative to maximum listening level,
2) duration of near-maximal listening level defined by the number of 20 ms frames for which the signal level was within 3 dB of its maximum ($LL_{max}=0$ and $-3$ dB),
3) normalized value of $\Delta\phi 1/\Delta t$ relative to averaged values of four trials. Note that absolute values of $\Delta\phi 1/\Delta t$ greatly depend on the speed of pronunciation and/or speaking rate, such that normalizing this parameter reduces its variability.
4) maximum values of $W_{\phi(0)}$ in parts of each syllable, namely $W_{\phi(0)max}$.

In order to briefly examine reliability of identification, three factors in FIGS. 21A-21D were selected, i.e., (1) $W_{\phi(0)max}$, (2) duration and (3) $\Delta\phi 1/\Delta t$ normalized by averaged values over four trials.

Figure 18:
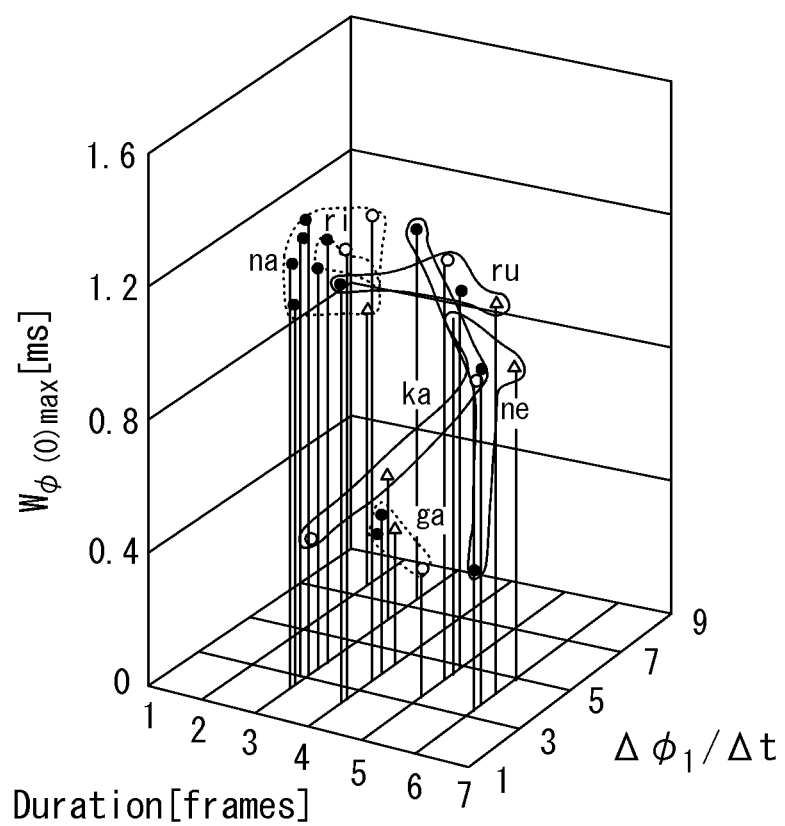
FIG. 18 is a mapping of Japanese Haiku phrase "kaneganarunari" in three-dimensional space using factors of $W_{\phi(0)max}$, duration and Δϕ1/Δt.

FIG. 18 is a mapping of Japanese Haiku phrase "kane-ganarunari" in three-dimensional space using factors of $W_{\phi(0)max}$, duration and $\Delta\phi 1/\Delta t$, where open symbols represent values obtained in quiet condition, and filled symbols represent values obtained in the noise condition. Duration of signals is defined by $-3$ dB from the maximum sound level. No systematic differences between quiet condition ($-61$ dB S/N re: maximum signal SPL) and noise condition ($-52$ dB S/N) were seen. Thus a weak noise such as the Gaussian noise produced by a mistuned FM radio has little influence on ACF-derived factors used for speech recognition.

It is also remarkable that syllables "ga", "na" and "ri" are mapped in a limited space, so that they can be immediately identified as having high reproducibility vis-a-vis this factor set. Other syllables have greater variability in one or more factor dimensions. For example, in the plot, syllable "ne" is distributed in the vertical axis of $W_{\phi(0)max}$, syllable "ru" is distributed in a horizontal axis for the factor $\Delta\phi 1/\Delta t$ and "ka" is distributed along both axes of $W_{\phi(0)max}$ and $\Delta\phi 1/\Delta t$, but not along the axis of duration. It is possible that each syllabic distinction is based on only one or two particular factors, the others being free to change considerably. It is worth noting that factors $\Delta\phi 1/\Delta t$ and duration are independent even though these two factors might each have some dependency on speech rate and/or speed of pronunciation.

REFERENCE SIGNS LIST

10 recording unit
12 LPF

14 AD converter
16 computer
18 storage unit
20 ACF calculating unit
22 ACF factor extracting unit
24 segmentation unit
26 identification unit
28 database

The invention claimed is:

1. A method for recognizing speech, comprising steps of:
recording speech signals by a recording unit;
attenuating, by a LPF, a high frequency component of the speech signals received from the recording unit;
converting, by an AD converter, the speech signals received from the LPF from analog signal to digital signal;
storing, by a storage unit, the speech signals received from the AD converter;
reading out, by a processor, the speech signals stored in the storage unit;
calculating, by the processor, running autocorrelation functions from the speech signals read out from the storage unit;
extracting, by the processor, following ACF factors from the running autocorrelation functions:
a $W_{\phi(0)}$ which is a width of ACF amplitude around zero-delay origin,
a $W_{\phi(0)max}$ which is a maximum value of the $W_{\phi(0)}$;
a $\tau_1$ which is a pitch period;
a $\phi_1$ which is a pitch strength; and
a $\Delta\phi_1/\Delta t$ which is a rate of the pitch strength change;
identifying, by the processor, syllables in the speech signals by comparing the ACF factors with templates stored in a database.

2. The method according to claim 1, further comprising the step of segmenting, by the processor, the speech signals into the syllables based on the ACF factors.

3. The method according to claim 1, further comprising the steps of:
extracting ACF factors from the running autocorrelation functions:
a LL which is a listening level calculated by the amplitude at an origin of non-normalized running ACF;
a $LL_{max}$ which is a maximum value of the LL; and
a $(\tau_e)_{min}$ which is a minimum value of effective duration $\tau_e$; and
segmenting, by the processor, the speech signals into the syllables based on the LL, the $(\tau_e)_{min}$, the $\Delta\phi_1/\Delta t$, the $\tau_1$ and the $W_{\phi(0)}$.

4. The method according to claim 1, wherein the identifying step is performed in each of the syllables at time points after a $(\tau_e)_{min}$.

5. The method according to claim 2, wherein the identifying step is performed in each of the syllables at time points after a $(\tau_e)_{min}$.

6. The method according to claim 3, wherein the identifying step is performed in each of the syllables at time points after the $(\tau_e)_{min}$.

7. The method according to claim 1, wherein the identifying step identifies the syllables in the speech signals based on a total distance between the ACF factors and the templates.

8. The method according to claim 2, wherein the identifying step identifies the syllables in the speech signals based on a total distance between the ACF factors and the templates.

9. The method according to claim 3, wherein the identifying step identifies the syllables in the speech signals based on a total distance between the ACF factors and the templates.

10. A speech recognition device, comprising:
a recording unit configured to record speech signals;
a LPF configured to attenuate a high frequency component of the speech signals received from the recording unit;
an AD converter configured to convert the speech signals received from the LPF from analog signal to digital signal;
a storage unit configured to store the speech signals received from the AD converter; and
a processor configured to read out the speech signals stored in the storage unit wherein the processor is configured to:
calculate running autocorrelation functions from the speech signals;
extract following ACF factors from the running autocorrelation functions:
a LL which is a listening level calculated by an amplitude at an origin of non-normalized running ACF;
a $LL_{max}$ which is a maximum value of LL;
a $W_{\phi(0)}$ which is a width of ACF amplitude around zero-delay origin,
a $W_{\phi(0)max}$ which is a maximum value of the $W_{\phi(0)}$;
a $\tau_1$ which is a pitch period;
a $\phi_1$ which is a pitch strength; and
a $\Delta\phi_1/\Delta t$ which is a rate of the pitch strength change; and
identify syllables in the speech signals by comparing the ACF factors with templates stored in a database.

11. The speech recognition device according to claim 10, wherein the processor is further configured to segment the speech signals into syllables based on the ACF factors.

12. The speech recognition device according to claim 10, wherein the processor further extracts
a LL which is a listening level from the running autocorrelation functions,
a $LL_{max}$ which is a maximum value of LL, and
a $(\tau_e)_{min}$ which is a minimum value of effective duration $\tau_e$, and
further configured to segment the speech signals into syllables based on the LL, the $(\tau_e)_{min}$, the $\Delta\phi_1/\Delta t$, the $\tau_1$ and the $W_{\phi(0)}$.

13. The speech recognition device according to claim 10, wherein the processor identifies each of the syllables at a time point after a $(\tau_e)_{min}$.

14. The speech recognition device according to claim 11, wherein the processor identifies each of the syllables at a time point after a $(\tau_e)_{min}$.

15. The speech recognition device according to claim 12, wherein the processor identifies each of the syllables at a time point after the $(\tau_e)_{min}$.

16. The speech recognition device according to claim 10, wherein the processor identifies the syllables in the speech signals based on a total distance between the ACF factors and the templates.

17. The speech recognition device according claim 11, wherein the processor identifies the syllables in the speech signals based on a total distance between the ACF factors and the templates.

18. The speech recognition device according to claim 12, wherein the processor identifies the syllables in the speech signals based on a total distance between the ACF factors and the templates.

* * * * *

UNITED STATES PATENT AND TRADEMARK OFFICE
CERTIFICATE OF CORRECTION

PATENT NO. : 9,514,738 B2
APPLICATION NO. : 14/442191
DATED : December 6, 2016
INVENTOR(S) : Yoichi Ando It is certified that error appears in the above-identified patent and that said Letters Patent is hereby corrected as shown below:

In the Specification

Column 2, Line 3, please delete "W$\alpha$(0)" and insert --W$\varphi$(0)--.

Column 2, Line 32, please delete "W$\alpha$(0)" and insert --W$\varphi$(0)--.

Column 11, Line 22, please delete "duration (which" and insert --duration (Te)min, which--.

In the Claims

Claim 3, Column 13, Line 40, please delete "extracting ACF" and insert --extracting, by the processor, following ACF--.

Signed and Sealed this
Ninth Day of May, 2017

Michelle K. Lee
*Director of the United States Patent and Trademark Office*